(12) United States Patent
Takanashi

(10) Patent No.: US 7,025,513 B2
(45) Date of Patent: Apr. 11, 2006

(54) OPTICAL APPARATUS, SHUTTER DEVICE, AND CAMERA

(75) Inventor: Tatsuo Takanashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/714,148

(22) Filed: Nov. 14, 2003

(65) Prior Publication Data

US 2004/0258405 A1    Dec. 23, 2004

(30) Foreign Application Priority Data

Nov. 18, 2002  (JP) ............................. 2002-334267
Nov. 27, 2002  (JP) ............................. 2002-344217
Dec. 27, 2002  (JP) ............................. 2002-382363

(51) Int. Cl.
*G03B 9/08* (2006.01)

(52) U.S. Cl. ...................................... 396/454; 396/456

(58) Field of Classification Search ................ 396/451, 396/453–456
See application file for complete search history.

(56) References Cited

U.S. PATENT DOCUMENTS 6,099,171 A * 8/2000 Takahashi .................. 396/451
6,554,502 B1 * 4/2003 Naganuma .................. 396/454
6,652,165 B1 * 11/2003 Pasquarella et al. ........ 396/453

FOREIGN PATENT DOCUMENTS

| JP | 62-3792 | 1/1987 |
|----|---------|--------|
| JP | 64-086121 | 3/1989 |
| JP | 08-313969 | 11/1996 |
| JP | 09-005831 | 1/1997 |
| JP | 2000-122109 | 4/2000 |
| JP | 2000-310803 | 11/2000 |

* cited by examiner

*Primary Examiner*—Christopher Mahoney
(74) *Attorney, Agent, or Firm*—Volpe and Koenig, P.C.

(57) ABSTRACT

A shutter/filter unit as an optical apparatus includes a shutter actuator, a filter actuator, a shutter drive ring, two shutter blades, and one ND filter, which are connected to a driving source body in series. The shutter blades are rotationally driven via the shutter drive ring so as to open and shut by the shutter actuator, and the ND filter is back and forth and rotationally driven by the filter actuator directly. The shutter blades and the ND filter are coaxially supported to a blade-support pin, and are rotationally driven independently. According to this apparatus, a conventional optical apparatus having a light-exclusion member and a light-attenuating member housed therein is further miniaturized so as to contribute miniaturization to an image-pickup apparatus, such as a camera, having the optical apparatus mounted thereon.

11 Claims, 20 Drawing Sheets

F I G. 3
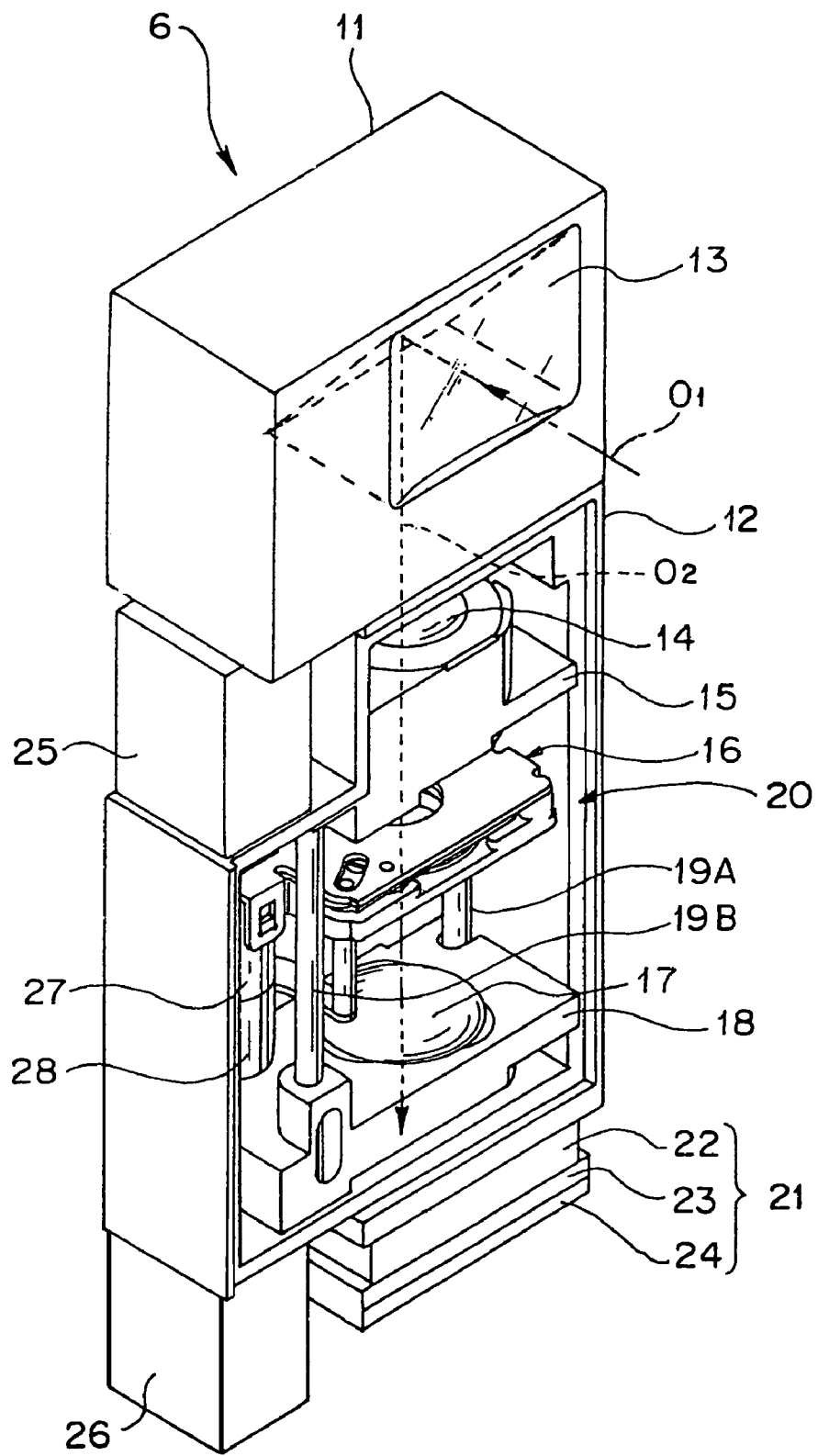

OPTICAL APPARATUS, SHUTTER DEVICE, AND CAMERA

CROSS REFERENCE TO RELATED APPLICATION(S)

This application claims benefit of Japanese Applications No. 2002-334267 filed in Japan on Nov. 18, 2002, No. 2002-344217 filed in Japan on Nov. 27, 2002, and 2002-382363 filed in Japan on Dec. 27, 2002, the contents of which are incorporated by this reference.

BACKGROUND OF THE INVENTION

1. Field of the Invention

The present invention relates to an optical apparatus having a light-attenuating device and a light-exclusion device assembled therein, and a structure of a camera having the optical apparatus further to a shutter device (optical device) having an exposure opening for passing photographing light therethrough, and a structure of a camera having the shutter device.

2. Related Art Statement

In a conventional optical system of an image-pickup apparatus such as a digital camera, there is a system having a light-attenuating filter (light-attenuating member) called an ND filter inserted therein. The reason for using the ND filter is as follows. That is, an image-pickup element such as a CCD is used in an electronic image-pickup apparatus; a photographing area of the image-pickup element is considerably smaller than the area of a conventional silver-camera film. Accordingly, a diaphragm opening must be relatively smaller; however, by the limit due to light-diffraction, the diaphragm opening cannot be reduced lower than a predetermined value so as to prevent the resolution to be deteriorated. Then, in the case where an exposure amount is required to considerably decrease for picking up a bright object in the outdoors, the exposure amount is totally reduced by adding the ND filter in addition to a mechanical opening diaphragm.

A light-amount adjusting device (optical device) housed in a lens-barrel and disclosed in Japanese Unexamined Patent Application Publication No. 2000-310803 has two diaphragm blades (light-exclusion members) entering and retracting relative to a photographing opening by rotation and an ND filter (light-attenuating member) such that the two diaphragm blades and the ND filter are rotationally driven about different rotational shafts by two actuators disposed to oppose the blades and the filter with the photographing opening therebetween.

Also, a diaphragm device (optical device) for a taking lens disclosed in Japanese Unexamined Patent Application Publication No. 2000-122109 has two diaphragm blades (light-exclusion members) entering and retracting relative to a photographing opening by sliding movement and an ND filter (light-attenuating member) such that the two diaphragm blades and the ND filter are slid by two actuators disposed with the photographing therebetween.

In any light-amount adjusting device (optical device) for a digital camera or the like disclosed in Japanese Unexamined Patent Application Publication No. 2000-310803 and No. 2000-122109 mentioned above, an actuator for driving the diaphragm blade and an actuator for driving the ND filter are arranged with the photographing opening therebetween, and the diaphragm blade and the ND filter are supported by different shafts rotatably or slidably.

Hitherto, in silver film cameras and digital cameras, the miniaturizing in external size is constantly required to enhance portability. Therefore, it is important to reduce spaces occupied by internal units within a camera. Among the internal units, a shutter device (optical device) mounted in an image pickup optical system is used in digital cameras as well as in silver-film cameras. For example, in digital cameras, during frame-image picking up by an interlace image-pickup element or during image picking up by a progressive image-pickup element, a mechanical shutter is required for preventing a smear.

Since the shutter device shields an optical path by opening and shutting thin blades, the size of the shutter device in the thickness direction (optical axial direction) is sufficiently small. Then, it is necessary for miniaturizing the shutter device to reduce the occupied space on a surface orthogonal to the optical axis. One prior art for solving this point, is Japanese Unexamined Patent Application Publication No. 8-313969, for example.

The shutter device (optical device) according to the Japanese Unexamined Patent Application Publication mentioned above incorporates a system in that the number of shutter blades is laterally divided into groups, each with two blades or more, for opening and shutting. In this shutter device, although the number of blades increases, the area of each blade is reduced so that the occupied space on the surface orthogonal to the optical axis is reduced to a size smaller than a conventional shutter device thereby realizing a compact size.

Also, in a shutter device for opening and shutting an exposure opening by operating conventional shutter blades, since the shutter blades are rapidly stopped when the blades reach the opened position or the shut position after the rotation (movement) at high speed, rebounding is liable to occur. The rebounding of the shutter blade non-preferably causes changes in exposure amount or light leakage. Then, various shutter devices, each having a rebound preventing mechanism of the shutter blade, have been proposed.

In a focal plane shutter disclosed in Japanese Unexamined Patent Application Publication No. 9-5831, there is provided an elastic buffer member for abutting a blade when a trailing slit blade or a leading slit blade (shutter blade) are driven to an exposure-start position or an exposure-completion position. The rebound of the slit blade at the terminal position is suppressed by the abutment of the elastic buffer member with the slit blade moving at high speed.

A magnetic drive shutter disclosed in Japanese Patent Publication No. 2627904 has a rotator housing a permanent magnet rotationally driven by an electromagnet as a driving source of shutter blades, so that the shutter blades are rotationally driven to the opened position or the shut position via the rotator. If the electromagnet is electrically turned on, the shutter blades are rotationally driven to the opened position. If the electromagnet is turned off, the shutter blades are rotationally driven to the shut position; at this time, the rotator abuts the elastic buffer member arranged at the rotation terminal position. The rebounding of the rotator is reduced at the terminal position by the abutment with the elastic buffer member so as to suppress the rebound of the shutter blades.

Furthermore, a rebound-preventing control device disclosed in Japanese Utility Model Registration No. 62-3792 is a control device applicable to a high-speed drive device, such as shutter blades of a camera, including a substrate having an exposure opening and shutter opening/closing plates slidably supported on the substrate. The shutter opening/closing plates are driven from one terminal position to the other terminal position by an abutting force of a charge spring corresponding to the operation of the electromagnet for opening and shutting the exposure opening of the substrate. When the plates reach the terminal position, a projected engaging member provided in the shutter opening/closing plates abuts the upper surface of the elastic buffer member so as to elastically deform the elastic buffer member. By the elastic deformation of the elastic buffer member, a braking force is applied to the shutter opening/closing plates so as to suppress the bound at the terminal position.

SUMMARY OF THE INVENTION

One optical apparatus according to the present invention is characterized in that a conventional optical apparatus having a light-exclusion member and a light-attenuating member housed therein is further miniaturized so as to contribute miniaturization to an image-pickup apparatus, such as a camera, having the optical apparatus mounted thereon.

Another optical apparatus according to the present invention is characterized in that in an optical apparatus having a light-exclusion member capable of opening and shutting an opening for passing a photographing luminous flux therethrough, the structure is simple and an occupied area on a surface orthogonal to an optical axis is small.

Furthermore, a shutter device according to the present invention is characterized in that the rebound of shutter blades is suppressed, the structure is simplified, and a space for arrangement is small.

One optical apparatus according to the present invention comprises a light-exclusion member for shielding a passing luminous flux passing along an optical path; first driving means for moving the light-exclusion member back and forth relative to the optical path; a light-attenuating member for reducing an amount of a passing luminous flux passing along the optical path; and second driving means for moving the light-attenuating member back and forth relative to the optical path, wherein the second driving means is arranged so as to pile up on the first driving means.

Another optical apparatus according to the present invention, which is arranged within a lens device having a movable lens for shielding and attenuating passing light, comprises a light-exclusion member for shielding passing light; first driving means for moving the light-exclusion member back and forth relative to an optical path; a light-attenuating member for attenuating the passing light; second driving means integrally piled up, i.e., stacked on the first driving means for moving the light-attenuating member back and forth relative to the optical path; and a case member having an opening for passing light, the light-exclusion member and the light-attenuating member being supported so as to move back and forth relative to the opening, and the first driving means and the second driving means being integrated with each other and being arranged sideward relative to the opening so that the piling up direction thereof is in parallel with the optical axis of the optical path, wherein at least one shaft for supporting the lens movably in the optical axial direction is arranged sideward relative to the opening and within the lens device so as to pass through the vicinity of the first driving means and the second driving means which are integrated with each other.

Still another optical apparatus according to the present invention comprises a plurality of light-exclusion members for shielding an opening for passing a photographing luminous flux therethrough in concert therewith; and driving means disposed adjacent to escape positions of the light-exclusion members for rotating the plurality of light-exclusion members between the escape positions escaping from the opening and shielding positions shielding the opening, wherein the plurality of light-exclusion members, each having an engaging hole to be commonly brought into engagement with an associated drive retainer of the driving means coaxially about a rotation center, are overlapped therewith at the escape positions and are rotated from the escape positions to the shielding positions by different angles and in the same direction so as to completely shield the opening.

Still another optical apparatus according to the present invention comprises an opening member having an opening for passing a luminous flux therethrough; a drive pin driven by a driving source; a leading shutter blade having a cam hole that is brought into engagement with the drive pin that drives the leading shutter blade for opening and shutting the opening; and a trailing shutter blade having a hole with a clearance that is brought into engagement with the drive pin after the leading shutter blade is moved, the drive pin driving the trailing shutter blade for opening and shutting the opening.

Still another shutter device according to the present invention comprises a shutter blade; and a shock absorber arranged out of a movement trajectory of the shutter blade, wherein impact produced when the shutter blade is stopped is absorbed by the shock absorber.

Still another shutter device according to the present invention comprises a shutter blade; and a shock absorber arranged out of a movement trajectory of the shutter blade in a displacing direction of the shutter blade displacing by deflection during movement of the shutter blade or immediately after the movement thereof in a direction substantially perpendicular to a moving direction of the shutter blade, wherein impact produced when the shutter blade is stopped is absorbed by the shock absorber.

Still another shutter device according to the present invention comprises a shutter blade; and a shock absorber arranged in a vicinity of a movement trajectory of the shutter blade and in a displacing direction of the shutter blade displacing by deflection of the shutter blade due to the movement of the shutter blade, wherein impact produced when the shutter blade is stopped is absorbed by the shock absorber.

Still another shutter device according to the present invention comprises a shutter blade; a guide unit for guiding deformation of the shutter blade when the shutter blade is temporarily stopped or finishes the movement of the shutter blade; and an absorbing member for absorbing kinematic energy of the shutter blade by abutting the shutter blade by the deformation of the shutter blade produced by the guidance, wherein the kinetic energy produced when the shutter blade is stopped or finishes the movement thereof is absorbed by the absorbing member.

Other features and advantages of the present invention will be apparent from a consideration of the following description.

BRIEF DESCRIPTION OF THE DRAWING(S)

FIG. 3 is a perspective view of the structure of a lens-barrel housed in the camera shown in FIG. 1;

DETAILED DESCRIPTION OF THE PREFERRED EMBODIMENT(S)

Embodiments according to the present invention will be described below with reference to the drawings.

Figure 1:
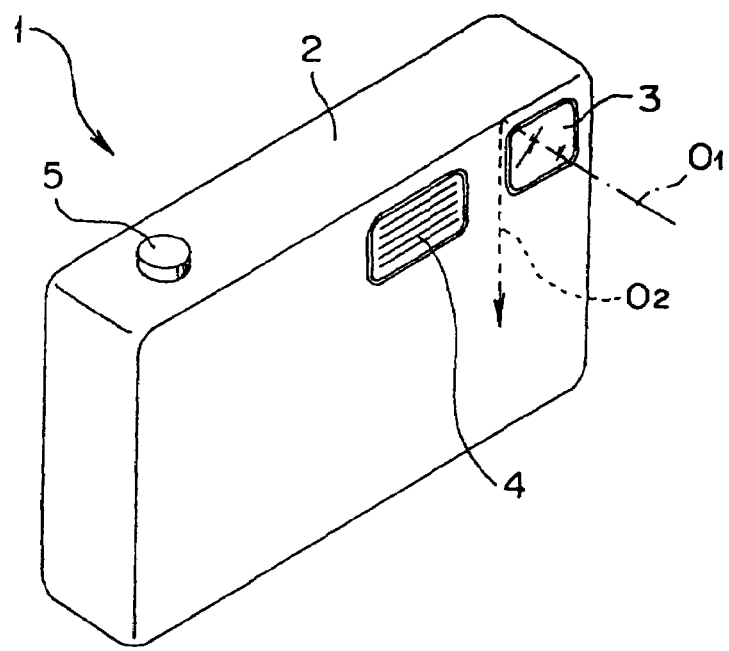
FIG. 1 is an exterior view of a camera incorporating a shutter/filter unit as an optical apparatus according to a first embodiment of the present invention.
Figure 2:
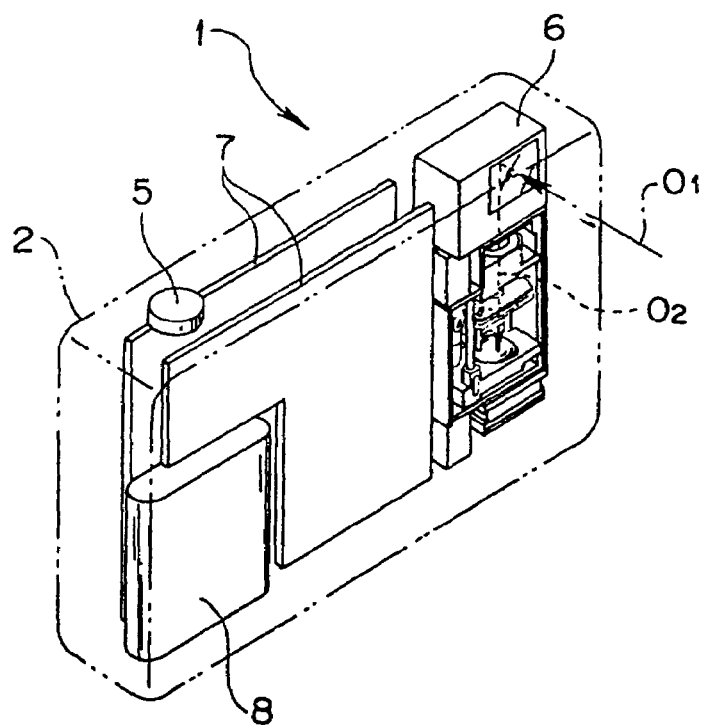
FIG. 2 is a perspective view of the internal arrangement of the camera shown in FIG. 1.
Figure 4:
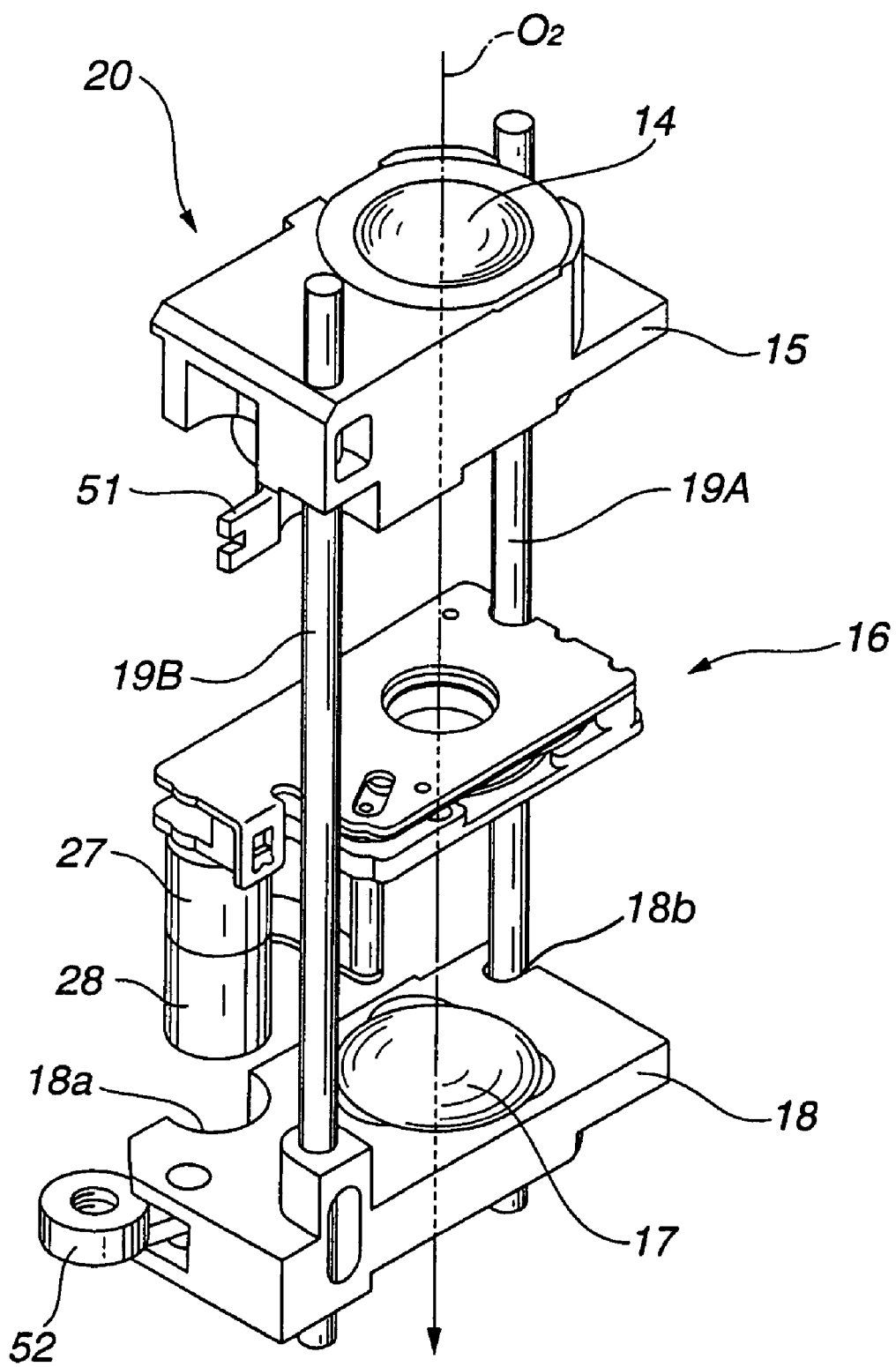
FIG. 4 is a perspective view of a lens device constituting the lens-barrel shown in FIG. 3.

FIG. 1 is an exterior view of a camera (digital camera) having a shutter-filter unit of an optical apparatus applied thereto according to a first embodiment of the present invention; FIG. 2 is a perspective view showing an internal arrangement of the camera; FIG. 3 is a perspective view of a lens-barrel unit housed in the camera; and FIG. 4 is a perspective view of a lens-device unit of the lens-barrel unit.

In the description below regarding arrangements, the left and right direction denotes the direction viewing a camera from an object; in the vertical direction, the upside is adjacent to an upper mirror frame 11, which will be described later, and as well as the incident side of an optical axis O2, which will be described later, and the downside is an image forming side, i.e., adjacent to the CCD unit 21. Furthermore, the rotational direction of each member of the optical apparatus is indicated by the rotational direction viewed from the above. These directional indications will be applied to a second embodiment of the present invention, which will be described later.

A camera 1 according to the first embodiment of the present invention includes a camera external cover 2 that includes a taking window 3 for importing an object luminous flux in an optical axial direction O1 and a stroboscopic window 4 for emitting stroboscopic light, which are arranged on the front surface, and a release button 5 arranged on the upper surface for initiating the start of photographing.

The camera 1, as shown in FIG. 2, is mainly provided with a lens-barrel unit 6 disposed inside the camera external cover 2; a plurality of electric circuit boards 7 disposed on the left of the lens-barrel unit 6, each having a camera main control circuit including a CPU and a media slot mounted thereon; and a power supply battery 8 disposed on the lower left of the electric circuit boards 7.

The lens-barrel unit 6 includes a power prism 13 of a folding optical system mounted to an upper mirror frame 11, a lens device 20 mounted to a lower mirror frame 12 and having a movable lens, a CCD unit 21 mounted at the lower end, and lens-driving motors 25 and 26 respectively disposed at upper and lower positions, which are stepping motors.

The power prism 13 refracts an object luminous flux reflected from an object along a direction of a first optical axis O1 downward at right angle in a direction of a second optical axis O2 so as to be emitted to a lens optical system of the lens device 20.

The lens device 20 as an optical apparatus, as shown in FIGS. 3 and 4, includes two guide shafts 19A and 19B fixed to the lower mirror frame 12 in parallel with the second optical axis O2 and arranged on opposite lateral sides thereof, a zoom frame 15 slidably supported to the guide shafts 19A and 19B for holding a zoom lens 14, a focus frame 18 for holding a focus lens 17, and a shutter/filter unit 16 supported at a position between the zoom frame 15 and the focus frame 18 in a state that its unit base portion is fixed to the lower mirror frame 12.

The lens-driving motors 25 and 26 are two stepping motors respectively disposed at upper and lower positions of the lower mirror frame 12, each having a lead screw (not shown), rotatably supported to the lower mirror frame 12 in parallel with the second optical axis O2. The lens-driving motors 25 and 26 are rotationally driven according to a command of a control circuit unit during zooming and focusing, respectively.

The zoom frame 15 and the focus frame 18 are rotatably restricted by the guide shaft 19A, which slidably intrudes notches formed in the frames 15 and 18 (note notch 18b, for example), and then are supported and slidably inserted upon the guide shaft 19A. An engaging member 51 engaged with a nut, which in turn is screwed with the lead screw of motor 25, is attached to the zoom frame 15. During zooming, the zoom frame 15 is driven back and forth via the engaging member 51 along the optical axis O2 by the rotation of the lead screw. A nut 52 screwed with the lead screw is attached to the focus frame 18. During focusing and zooming, the focus frame 18 is driven back and forth via the nut 52 along the optical axis O2 by the rotation of the lead screw of motor 26.

The CCD unit 21, as shown in FIG. 3, includes an optical filter 22, a CCD 23 which is an image-pickup element, and a CCD substrate 24, and it is fixed at a lower position of the lower mirror frame 12 along the optical axis O2.

Next, the structure of the shutter/filter unit 16 assembled in the lens device 20 will be described in detail with reference to FIGS. 5 and 6.

Figure 5:
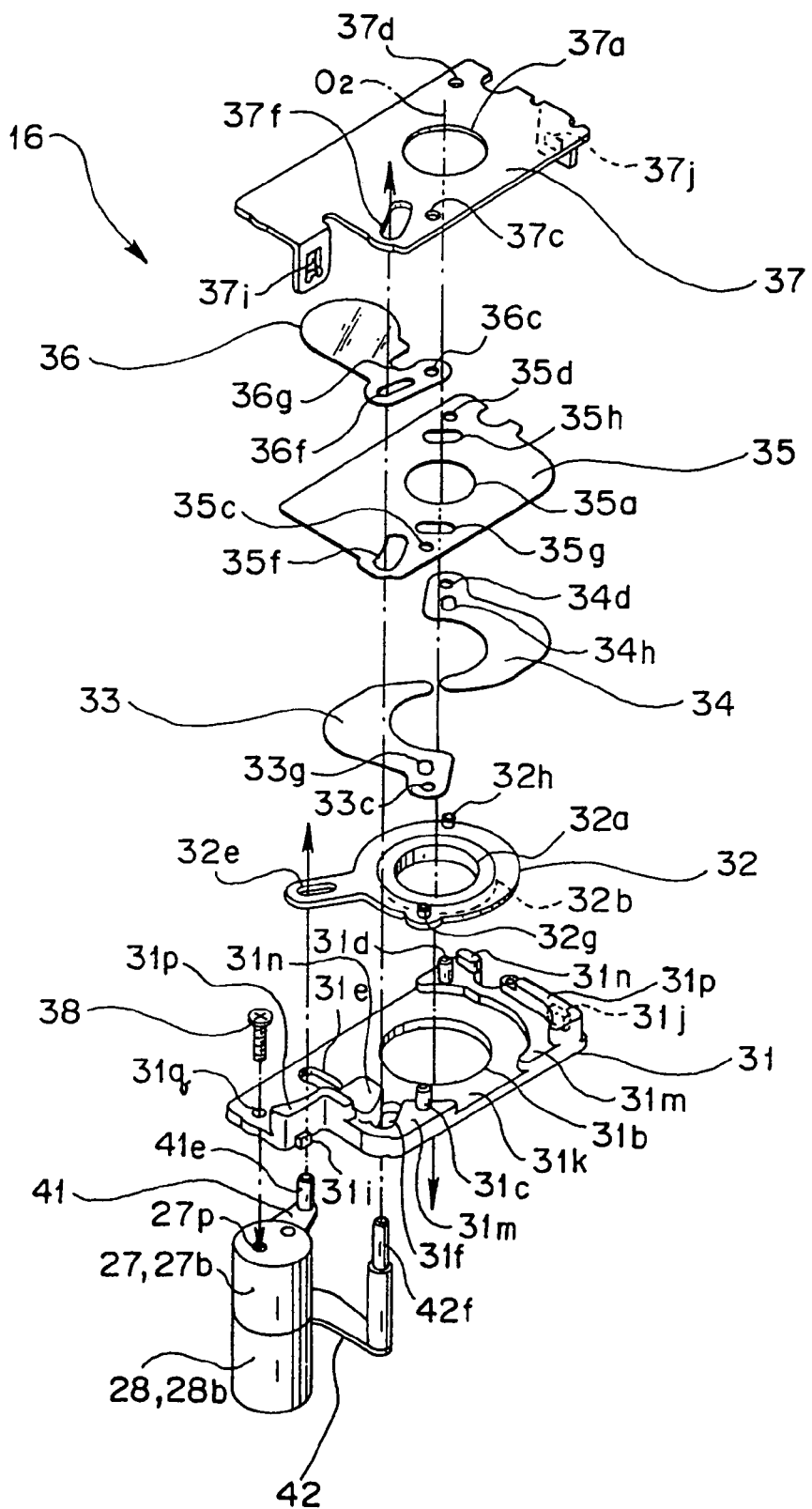
FIG. 5 is an exploded perspective view of a shutter/filter unit assembled in the lens device shown in FIG. 4.
Figure 6:
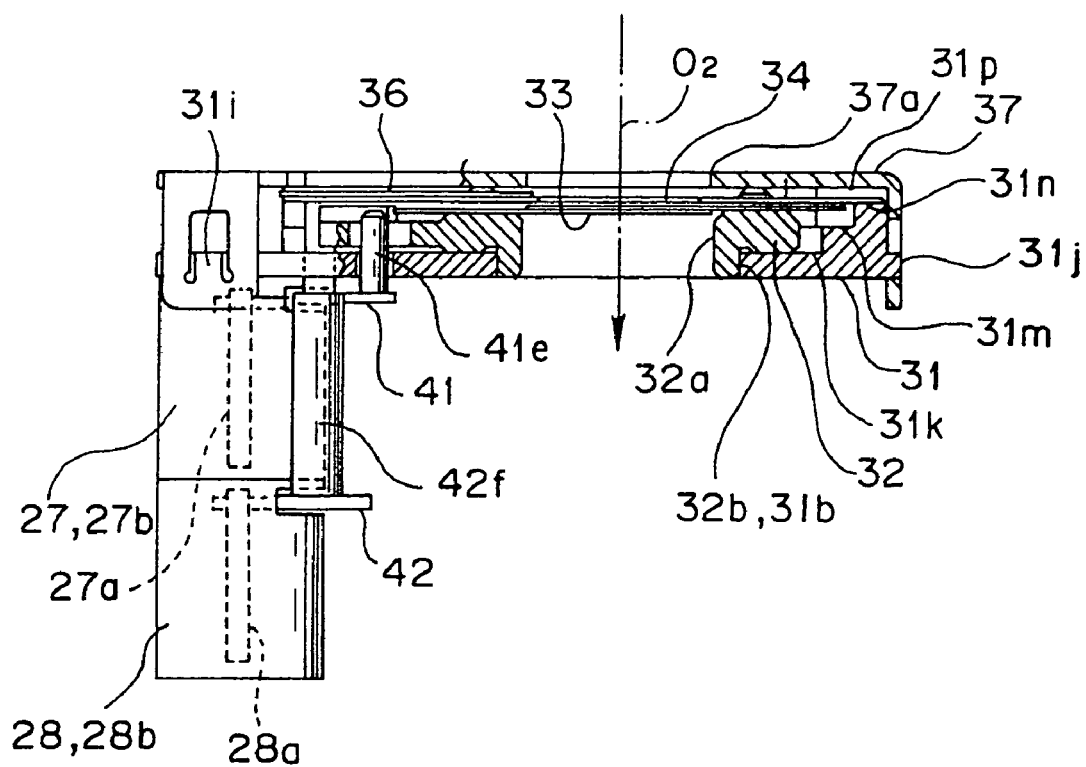
FIG. 6 is a longitudinal sectional view of the shutter/filter unit shown in FIG. 5.

FIG. 5 is an exploded perspective view of the shutter/filter unit; and FIG. 6 is a longitudinal sectional view of the shutter/filter unit.

The shutter/filter unit 16, as shown in FIG. 5, includes a unit base 31, which is a case member; a blade drive ring 32; two shutter blades 33 and 34, which are light-exclusion members; a spacer 35; an ND filter 36, which is a light-attenuating member; a unit cover 37; a rotary solenoid-type shutter actuator 27, which is a first drive unit; and a rotary solenoid-type filter actuator 28, which is a second drive unit.

The unit base 31 is provided with a fitting opening 31b formed at the center of the optical axis O2 on the light-incident side on a first plane 31k; elongated holes 31e and 31f formed on the same first plane 31k; a screw insertion hole 31q; stepped blade-support pins 31c and 31d, which are two rotation shafts arranged to oppose on a second plane 31m, which is higher than the first plane 31k by a predetermined size; a third plane 31n, which is higher than the second plane 31m by a predetermined size; and a fourth plane 31p, which is further higher than the third plane 31n by a predetermined amount.

The shutter actuator 27 and the filter actuator 28, which are drive sources, include rotation shafts 27a and 28a, which are central axes about which the actuators are rotationally driven from on-positions to off-positions, respectively. In a state that the rotation shafts 27a and 28a are coaxially aligned, body cases 27b and 28b of the actuators are integrally piled up in parallel with the optical axis O2. The body cases 27b and 28b are attached to the unit base 31 by a screw 38, which is inserted through the screw insertion hole 31q located at a position on the left of the optical axis O2, and then screwed into a tapped hole 27p of the body case 27b. In addition, the body cases 27b and 28b are located in the vicinity of the guide shaft 19B.

In the attached state of the actuators 27 and 28, the rotation shafts 27a and 28a are held in parallel with the optical axis O2, and the shutter actuator 27 is located upside while the filter actuator 28 is located downside. That is, the shutter actuator 27 is arranged closer to the shutter blades 33 and 34 and the ND filter 36. The actuators 27 and 28 are attached in the vicinity of the guide shaft 19B of the zoom frame 15 and the focus frame 18, which are lens holding frames in the lens device 20, and as well as being arranged along the guide shaft 19B.

To the rotation shaft 27a of the shutter actuator 27, a laterally protruding blade-drive arm 41 is fixed. The blade-drive arm 41 is provided with a blade-drive pin 41e, which is arranged at the end of the arm in parallel with the optical axis O2 and inserted into the elongated hole 31e of the unit base 31 so as to protrude upward and above plane 31k.

To the rotation shaft 28a of the filter actuator 28, a laterally protruding ND-drive arm 42 is fixed. The ND-drive arm 42 is provided with an ND-drive pin 42f, which is arranged in parallel with the optical axis O2 and inserted into the elongated hole 31f of the unit base 31 and further into an elongated hole 35f of the spacer 35 so as to protrude upward.

The blade drive ring 32 is provided with a ring opening 32a disposed in the center, a fitting projection 32b formed beneath the ring opening 32a rotatably fitting into the fitting opening 31b, an elongated hole 32e formed in a radially extending portion, and blade-drive pins 32g and 32h opposing each other and formed about the ring opening 32a. The blade drive ring 32 is slidably attached on the first plane 31k of the unit base 31 by rotatably fitting the fitting projection 32b into the fitting opening 31b of the unit base 31. Into the elongated hole 32e extending in the radial direction of the blade drive ring 32, the blade-drive pin 41e of the shutter actuator 27 fits slidably and rotatably. In addition, the ring opening 32a is slightly larger in size than a diaphragm opening 35a of the spacer 35, which will be described later.

The shutter blades 33 and 34, each having a U-shape capable of opening and closing the diaphragm opening 35a by rotating the ring 32, are provided with pin holes 33c and 34d and elongated holes 33g and 34h, respectively. The shutter blades 33 and 34 oppose each other about the optical axis O2, and are placed on the blade drive ring 32 in a state of partly overlapping in the optical axial direction O2. The shutter blades 33 and 34 are assembled such that the blade-support pins 31c and 31d of the unit base 31 are rotatably fitted into the pin holes 33c and 34d, respectively, while the blade-drive pins 32g and 32h of the blade drive ring 32 are rotatably and slidably fitted into the elongated holes 33g and 34h, respectively.

The spacer 35 is provided with a diaphragm opening 35a formed along the optical axis O2, pin holes 35c and 35d, the elongated hole 35*f*, and elongated holes 35*g* and 35*h*. The spacer 35 is positioned and attached above the shutter blade 34 in a placed state resting on the third plane 31*n* of the unit base 31, such that the blade-support pins 31*c* and 31*d* are inserted into the pin holes 35*c* and 35*d*, respectively. In this mounting state, the ND-drive pin 42*f* is inserted into the elongated hole 35*f* while the elongated holes 35*g* and 35*h* are clearance holes receiving the blade-drive pins 32*g* and 32*h*, respectively. By providing the spacer 35, a rotational clearance between the shutter blades 33 and 34 in the optical axial direction O2 is secured while the shutter blade 33 and 34 are separated from the ND filter 36 so that both of these components are rotatably supported independently without interfering with each other.

The ND filter 36, having a shape capable of covering the diaphragm opening 35*a* and retracting from the diaphragm opening 35*a* by the entering and retracting rotation, is provided with a pin hole 36*c*, an elongated hole 36*f*, and a notch 36*g* to provide clearance for the blade-drive pin 32*g*. The ND filter 36 is attached on the spacer 35 such that the blade-support pin 31*c* of the unit base 31 is rotatably fitted into the pin hole 36*c* while the ND-drive pin 42*f* of the filter actuator 28 is fitted into the elongated hole 36*f* rotatably and slidably.

The unit cover 37 is provided with an opening 37*a* formed about the optical axis O2, pin holes 37*c* and 37*d*, an elongated hole 37*f*, and retaining holes 37*i* and 37*j* formed in two respective raised portions. The unit cover 37 is placed on the fourth plane 31*p* above the ND filter 36 such that the ND-drive pin 42*f* is inserted into the elongated hole 37*f* and the support pins extend into the pin holes 37*c* and 37*d* and so that its thickness extends in the optical axial direction O2 and its surfaces are perpendicular to the optical axis O2. In this state, the unit cover 37 is mounted such that the retaining holes 37*i* and 37*j* of the unit cover 37 are brought into locking engagement with retaining projections 31*i* and 31*j* of the unit base 31.

In the shutter/filter unit 16 assembled as described above, the ND filter 36 and the shutter blades 34 and 33 are rotatably held between the unit cover 37 and the spacer 35 and between the spacer 35 and the unit base 31, respectively.

In addition, the shutter/filter unit 16 is arranged within the perimeter of the unit base 31, so that an occupied area on a plane orthogonal to the optical axis O2 is given by the unit base 31.

In the shutter/filter unit 16 structured as above, the opening and shutting operation of the shutter blades and entering and retracting operation of the ND filter will be described with reference to FIGS. 7A and 7B and FIGS. 8A and 8B.

Figure 7A:
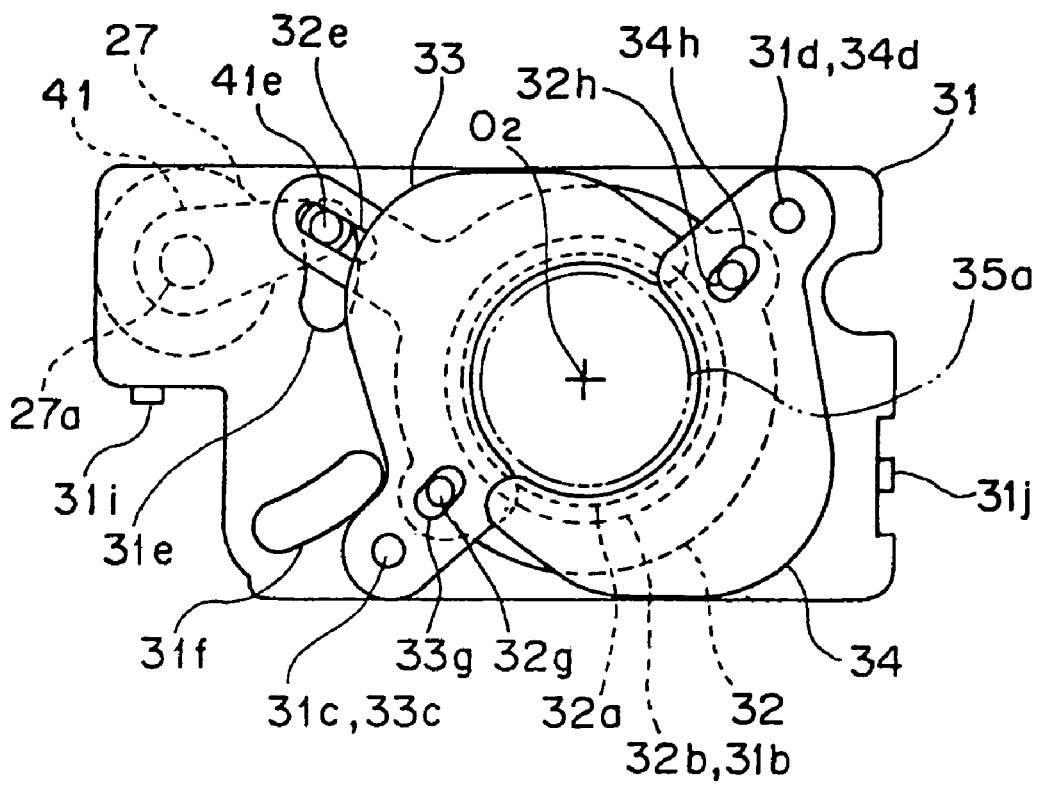
FIG. 7A is a plan view showing an opened state of a shutter unit in the shutter/filter unit shown in FIG. 5 viewed from the incident side of an optical axis.
Figure 7B:
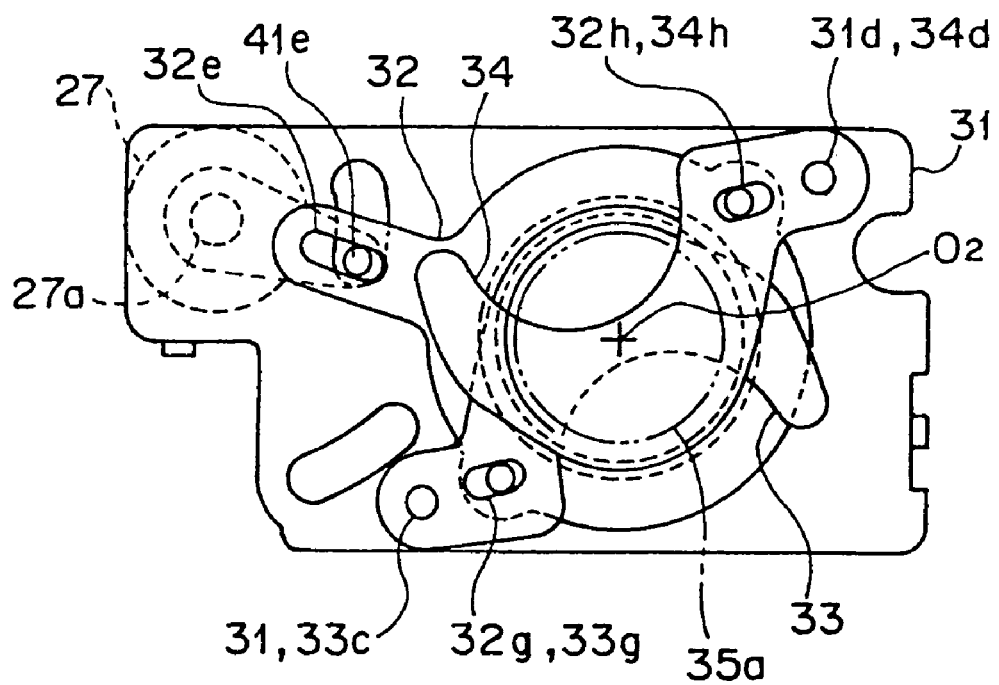
FIG. 7B is a plan view showing a shut state of the shutter unit in the shutter/filter unit shown in FIG. 5 viewed from the incident side of the optical axis.
Figure 8A:
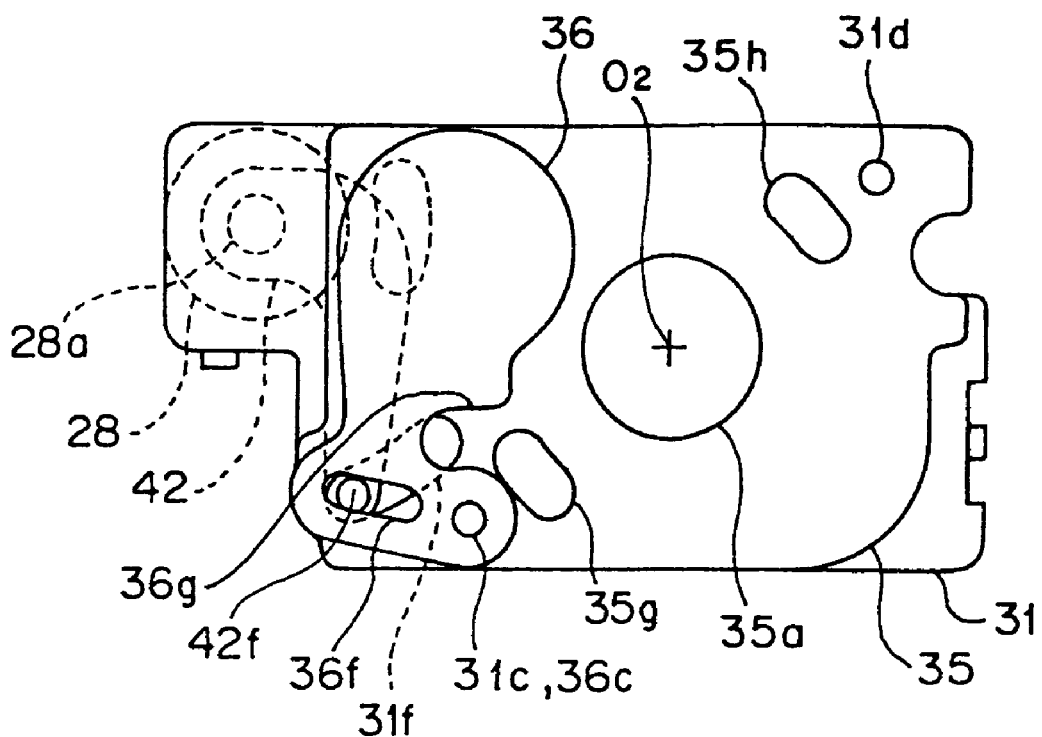
FIG. 8A is a plan view showing a non-attenuating state of an ND filter unit in the shutter/filter unit shown in FIG. 5 viewed from the incident side of the optical axis.
Figure 8B:
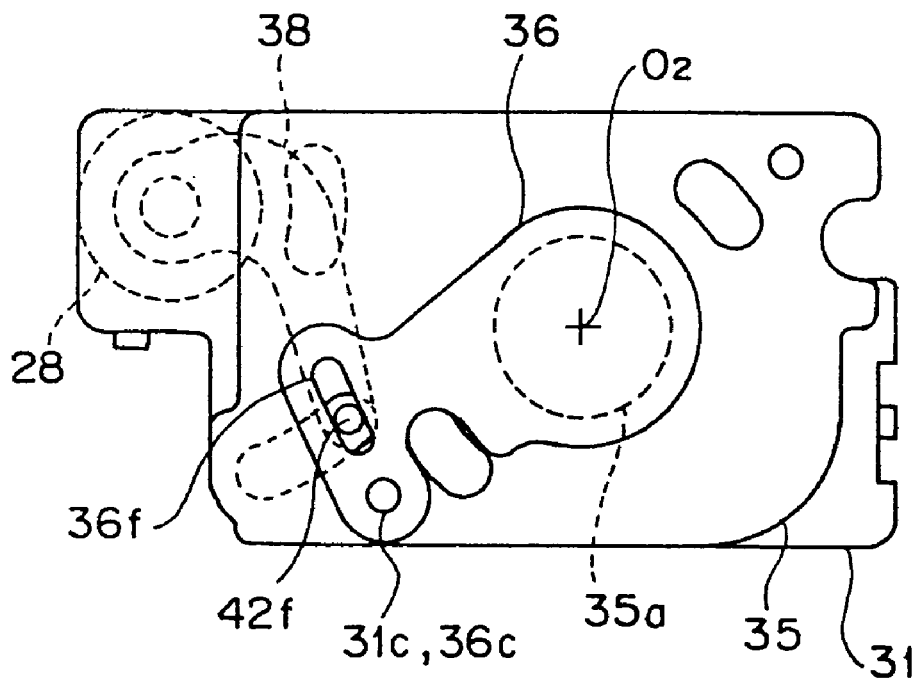
FIG. 8B is a plan view showing an attenuating state of the ND filter unit in the shutter/filter unit shown in FIG. 5 viewed from the incident side of the optical axis.

In addition, FIGS. 7A and 7B are plan views showing the opening and shutting operation of the shutter blades viewed from the incident side of the optical axis O2 (from the above); FIG. 7A shows the opened shutter; and FIG. 7B shows the shutter in a shut state. FIGS. 8A and 8B are plan views showing light attenuation operation of the ND filter in the shutter/filter unit viewed from the incident side of the optical axis O2 (from above); FIG. 8A shows a non-attenuated state; and FIG. 8B shows an attenuated state.

In the normal opened state of the shutter, as shown in FIG. 7A, the shutter actuator 27 is in the off state; the blade-drive arm 41 is rotated counterclockwise; the blade-drive ring 32 is rotated clockwise about the optical axis O2 via the blade-drive pin 41*e*; and the shutter blades 33 and 34 are rotationally driven about the blade-support pins 31*c* and 31*d* of the unit base 31 in the opening direction by the blade-drive pins 32*g* and 32*h*, respectively, so as to retract from the ring opening 32*a* to an opening rotational position.

Immediately after photographing completion, if the shutter actuator 27 is turned on so that the blade-drive arm 41 is rotated clockwise, as shown in FIG. 7B, the blade drive ring 32 is rotated counterclockwise about the optical axis O2 via the blade-drive pin 41*e* so that the shutter blades 33 and 34 are rotated in the shutting direction about the blade-support pins 31*c* and 31*d* by the blade-drive pins 32*g* and 32*h*, respectively, so as to assume the shut state of the shutter in that the ring opening 32*a* is covered.

On the other hand, in the opened state of the ND filter, as shown in FIG. 8A, the filter actuator 28 is in the off state; the ND-drive arm 42 is rotated clockwise; and the ND filter 36 is rotated counterclockwise about the blade-support pin 31*c* via the ND-drive pin 42*f* so as to retract from the diaphragm opening 35*a* of the spacer 35 to an opening rotational position. This is a non-attenuated (i.e., non-blocking) state, and all of the luminous fluxes of the object pass through an opening of the ND filter.

If the filter actuator 28 is turned on so that the ND-drive arm 42 is rotated counterclockwise, as shown in FIG. 8B, the ND filter 36 is rotated clockwise about the blade-support pin 31*c* via the ND-drive pin 42*f* so as to move to an attenuated rotational position covering the diaphragm opening 35*a*. This is an attenuated (i.e., filtering) state, and an object luminous flux passes therethrough so as to be attenuated by a predetermined amount according to the transmission characteristics of the ND filter.

In the camera 1 according to the embodiment described above, when the photographing is executed, first, the zoom frame 15 is driven back and forth in the optical axial direction O2, and then the zooming state of the lens device 20 is set in a desired state. During zooming, the focus frame 18 is also moved to a corresponding position. Then, the object brightness is measured prior to the photographing. When the object brightness is equal to or greater than a predetermined value, the ND filter 36 is rotationally driven at a position covering the diaphragm opening 35*a* to be in an attenuated state shown in FIG. 8B. Also, when the object brightness is less than a predetermined value, the ND filter 36 is held at a position retracted from the diaphragm opening 35*a* to be in a non-attenuated state shown in FIG. 8A. In addition, the shutter blades 33 and 34 are held at an opened position retracted from the ring opening 32*a*.

Consequently, if the focus frame 18 is driven back and forth corresponding to pushing operation of the release button 5 and focused, an object luminous flux image in the attenuated state or the non-attenuated state is formed on the image forming surface of the CCD 23. By the CCD 23, object images are converted into electrical photographing signals. After a lapse of a predetermined period of time, the shutter blades 33 and 34 are rotationally driven to the shut position covering the diaphragm opening 35*a* shown in FIG. 7B so that the object luminous flux is cut off.

The electrical photographing signals are converted into digital image signals and stored in a memory so as to finish the photographing under the control of the CPU (not shown) provided on one of the circuit boards 7.

According to the optical device (optical device unit) 20 that is the optical apparatus of the camera 1 according to the first embodiment, the shutter actuator 27 and the filter actuator 28 are piled (i.e. stacked) up in a direction in parallel with the optical axis O2 of the folding optical system, and are positioned to one side of the diaphragm opening 35*a* and in the vicinity of the guide shaft 19B of the zoom frame 15 and the focus frame 18, so that the occupied space for the actuators is reduced while the arrangement efficiency of an orthogonal plane to the optical axis O2 in the lens device 20 can be increased, achieving miniaturization.

Furthermore, the shutter actuator 27 is arranged closer to the shutter blades 33 and 34 and the ND filter 36 than the filter actuator 28, so that the blade-drive pin 41e can be reduced in length, enabling the shutter blades 33 and 34 requiring a high speed to be opened and shut at the high speed.

Also, the blade-support pin 31c of the unit base 31, which is the rotation shaft of the shutter blade 33, is also the rotation shaft of the ND filter 36, so that the shutter blade 33 and the ND filter 36 are rotationally moved in substantially the same area, enabling the arrangement of the shutter/filter unit 16 to fall within an area projected on to a plane orthogonal to the optical axis O2 of the unit base 31. An area in said plane occupied by the zoom frame 15 and the focus frame 18 for the focus optical system especially required for the lens device having a zooming function, can be substantially equalized with the project area of the shutter/filter unit 16, so that, coupled with the increased arrangement efficiency of the actuators described above, the miniaturization of not only the lens device 20 but also the zooming camera can be achieved.

According to the first embodiment described above, the digital camera is exemplified; alternatively, the optical apparatus according to the present invention may be incorporated for use as camera units housed in a mobile telephone and a PDA, so that the mobile telephone and the PDA can be miniaturized.

As described above, according to the optical apparatus of the first embodiment of the present invention, the first and the second drive units are arranged by piling (i.e., stacking) them up, so that in comparison with the dispersed arrangement as in a conventional optical apparatus, the optical apparatus can be miniaturized by the high density mounting. Also, the projection of areas occupied by the first and the second drive units on to an orthogonal plane to the optical axis can be reduced, so that the length measured in the radial direction of the optical apparatus, on which the units are mounted, can be reduced. Moreover, arranging the first drive unit closer to the light-attenuating member and the light-exclusion member than the second drive unit enables the opening and shutting speed of the light-exclusion member to be increased. Furthermore, the sharing at least one of the rotation shafts of the light-attenuating member and the light-exclusion member achieves further miniaturization of the optical apparatus. The first and the second drive units in the piled up (i.e. stacked) state are arranged in the vicinity of one of the shafts for guiding the lens in the optical axial direction, achieving miniaturization of the optical apparatus.

Also, according the camera of the first embodiment, since the optical apparatus described above is housed therein, a compact camera can be achieved.

Figure 9:
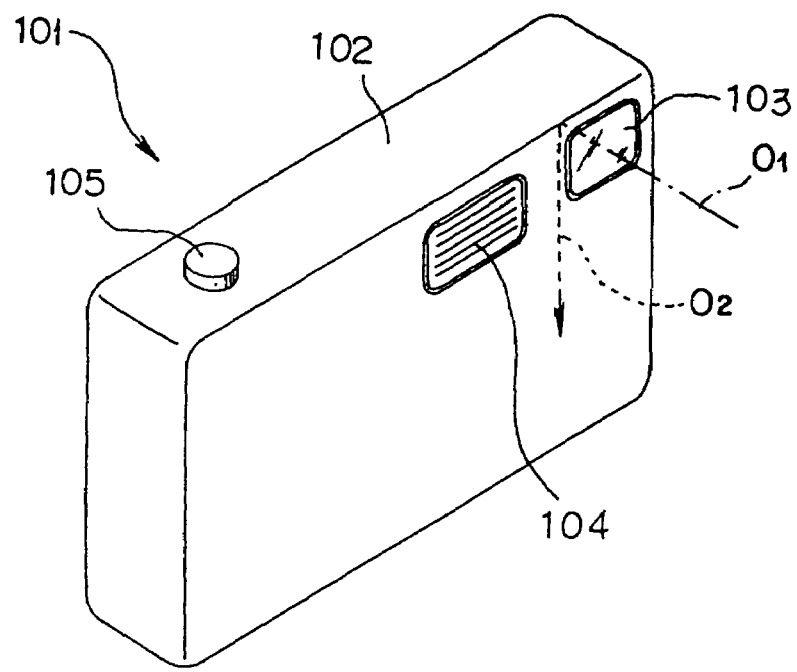
FIG. 9 is an exterior view of a camera incorporating a shutter unit as an optical apparatus according to a second embodiment of the present invention.
Figure 10:
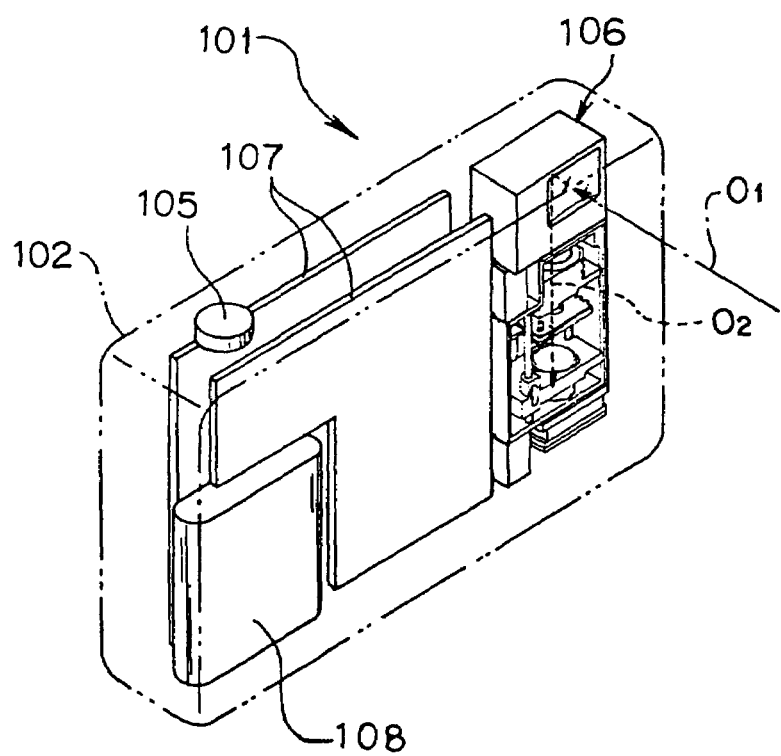
FIG. 10 is a perspective view of the internal arrangement of the camera shown in FIG. 9.
Figure 11:
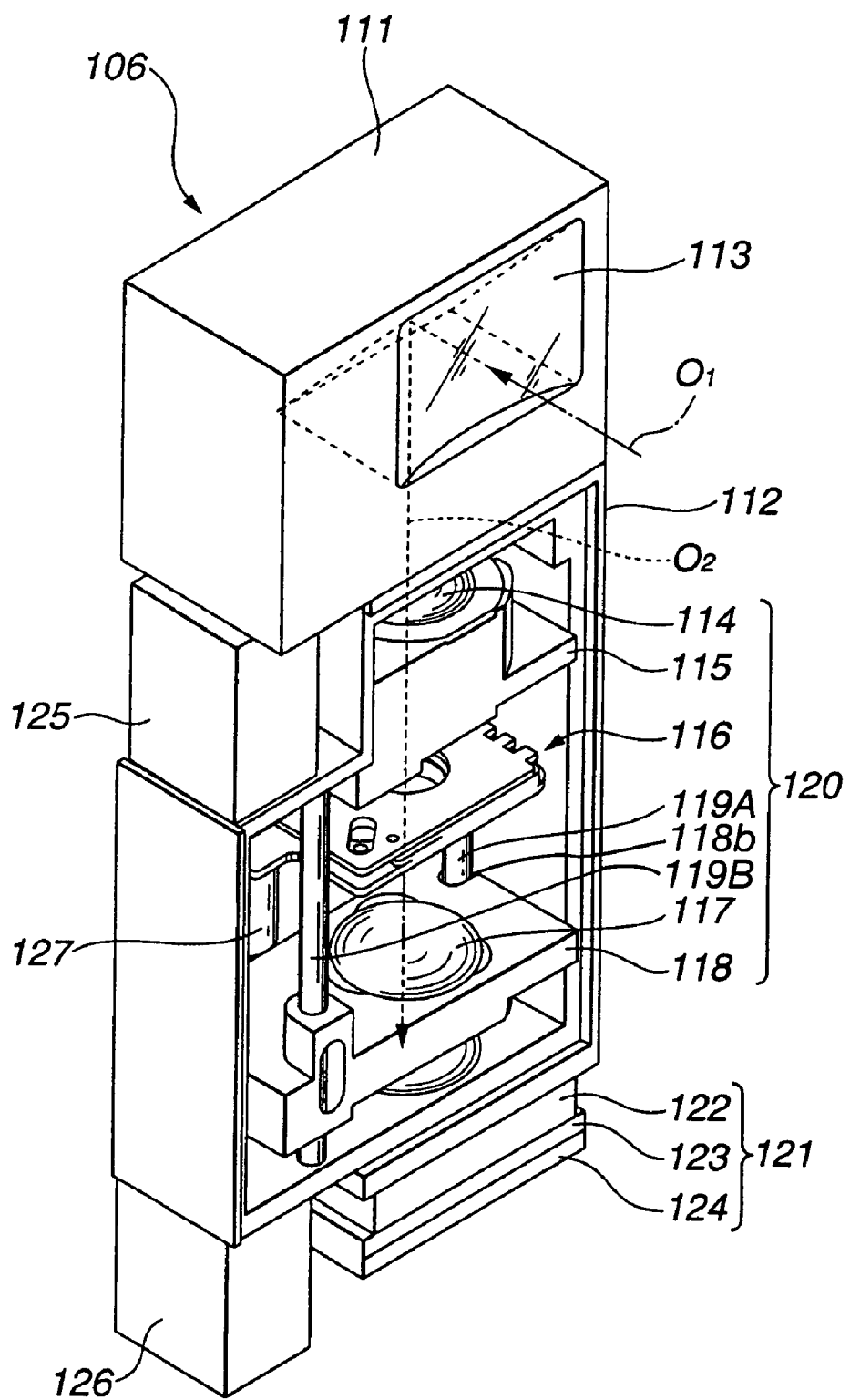
FIG. 11 is a perspective view of the structure of a lens-barrel housed in the camera shown in FIG. 9.

FIG. 9 is an exterior view of a camera (digital camera) incorporating a shutter unit that is an optical apparatus according to a second embodiment of the present invention; FIG. 10 is a perspective view showing the internal arrangement of the camera; and FIG. 11 is a perspective view of a lens-barrel housed in the camera.

A camera 101 according to the second embodiment of the present invention includes a camera external cover 102 that includes a taking window 103 for importing an object luminous flux in the optical axial direction O1 and a stroboscopic window 104 for emitting stroboscopic light, which are arranged on the front surface, and a release button 105 arranged on the upper surface for indicating the start of photographing.

The camera 101, as shown in FIG. 10, is mainly provided with a lens-barrel unit 106 disposed inside the camera external cover 102; a plurality of electric circuit boards 107 disposed in the left of the lens-barrel unit 106, each having a camera main control circuit including a CPU and a media slot mounted thereon (not shown for purposes of simplicity); and a power supply battery 108 disposed in the lower left of the electric circuit boards 107.

The lens-barrel unit 106 includes a power prism 113 of a folding optical system mounted to an upper mirror frame 111, a lens device 120 mounted to a lower mirror frame 112 and having a movable lens, a CCD unit 121 mounted at the lower end, and lens-driving motors 125 and 126 respectively disposed at upper and lower positions, which are stepping motors.

The power prism 113 refracts an object luminous flux entering from an object along a direction of the first optical axis O1 downward at right angle in a direction of the second optical axis O2 so as to be emitted to a lens optical system of the lens device 120.

Figure 12:
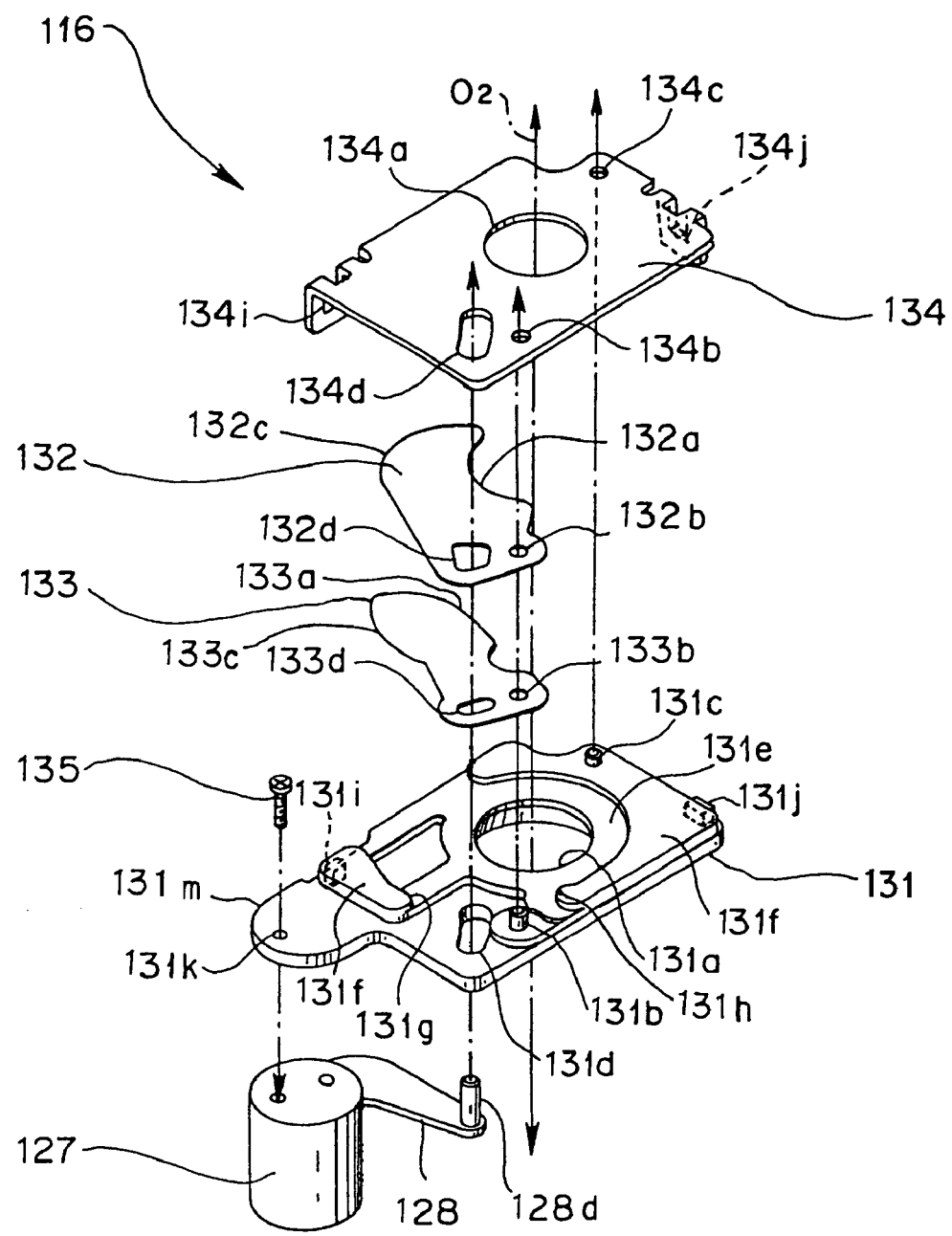
FIG. 12 is an exploded perspective view of a shutter unit assembled in the lens-barrel shown in FIG. 11.

The lens device 120 as an optical apparatus, as shown in FIGS. 11 and 12, includes two guide shafts 119A and 119B fixed to the lower mirror frame 112 in parallel with the second optical axis O2 and are arranged on opposite lateral sides thereof, a zoom frame 115 slidably supported by the guide shafts 119A and 119B for holding a zoom lens 114, a focus frame 118 for holding a focus lens 117, and a shutter/filter unit 116 supported at a position between the zoom frame 115 and the focus frame 118 in a state that its unit base portion is fixed to the lower mirror frame 112.

The lens-driving motors 125 and 126 are two stepping motors respectively disposed at upper and lower positions of the lower mirror frame 112, each having a lead screw (not shown), rotatably supported to the lower mirror frame 112 in parallel with the second optical axis O2. The lens-driving motors 125 and 126 are rotationally controlled according to a command of a control circuit unit during zooming and focusing, respectively.

The zoom frame 115 and the focus frame 118 are rotatably restricted by the guide shaft 119A, which slidably intrudes notches formed in the frames 115 and 118 (note notch 118b), and then are slidably supported by guide shaft 119B. An engaging member engaged with a nut, which in turn is screwed with the lead screw, is attached to the zoom frame 115. During zooming, the zoom frame 115 is driven back and forth via the engaging member along the optical axis O2 by the rotation of the lead screw. A nut screwed with the lead screw is attached to the focus frame 118. During focusing and zooming, the focus frame 118 is driven back and forth via the nut along the optical axis O2 by the rotation of the associated lead screw.

The CCD unit 121, as shown in FIG. 11, includes an optical filter 122, a CCD 123, which is an image-pickup element, and a CCD substrate 124, and is fixed at a lower position of the lower mirror frame 112 along the second optical axis O2.

Next, the structure of the shutter/filter unit 116 assembled in the lens device 120 of the lens-barrel unit 106 will be described in detail with reference to FIGS. 12 and 13.

Figure 13:
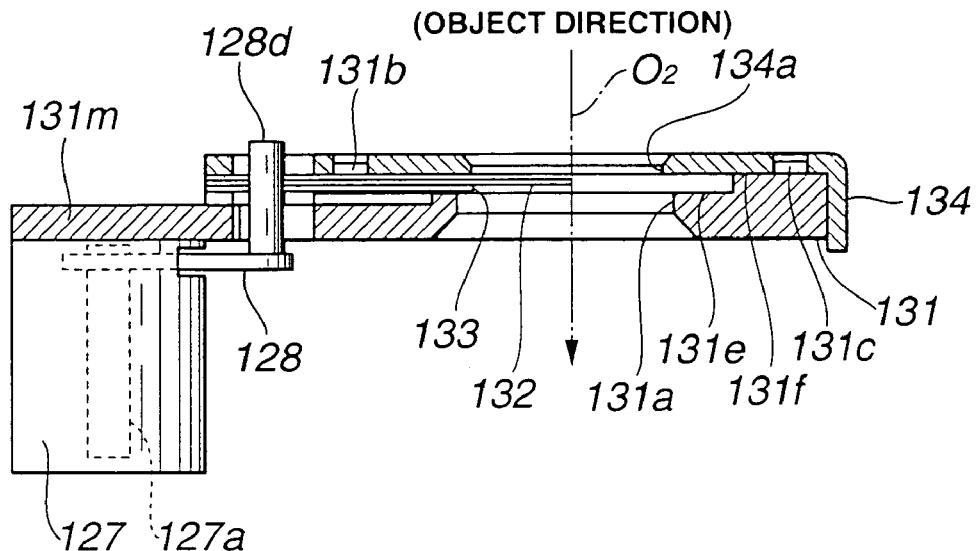
FIG. 13 is a longitudinal sectional view of the shutter unit shown in FIG. 12.

FIG. 12 is an exploded perspective view of the shutter/filter unit; and FIG. 13 is a longitudinal sectional view of the shutter/filter unit.

The shutter/filter unit 116, as shown in FIG. 12, includes a unit base 131, a trailing first shutter blade 132, a leading second shutter blade 133, which are light-blocking members, a unit cover 134, and a rotary solenoid-type shutter actuator 127, which is a drive unit.

The unit base 131 made of a resin portion outsert-molded to a metallic substrate 131m is provided with a base opening 131a disposed at the center of the optical axis O2 on a first plane 131e orthogonal to the optical axis O2 in the incident side; a blade-support pin 131b arranged on a plane slightly lower than the first plane 131e by a clearance; a first stopper 131g and a second stopper 131h having surfaces that are convex in the optical axial direction and arranged on a second plane 131f, which is higher than the first plane 131e by a predetermined amount; a positioning pin 131c for the unit cover 134 arranged on the second plane 13 if; two laterally protruding retaining projections 131i and 131j for fixing the unit cover; an elongated hole 131d formed on a plane of the substrate 131m lower than the first plane 131e; and a screw insertion hole 131k. In addition, the base opening 131a of the unit cover 134 is slightly larger than a diaphragm opening 134a, which will be described later.

The shutter actuator 127 includes a rotation shaft 127a, about which the actuator is rotationally driven from the on-position to the off-position. The shutter actuator 127 is attached adjacent to a retracted position of shutter blades 132 and 133 in parallel with the optical axis O2 by means of a screw 135 inserted into the screw insertion hole 131k of the unit base 131. Alternatively, the shutter actuator 127 may be directly fixed to the metallic substrate 131m of the unit base 131 by spot welding. The mounting position of the shutter actuator 127 is in the vicinity of the guide shaft 119B and on the left of the optical axis O2 in the lens device 120.

To a rotation shaft 127a of the shutter actuator 127, a laterally protruding blade-drive arm 128 is fixed as a drive member (FIG. 13). The blade-drive arm 128 is provided with a blade-drive pin 128d that is a drive retainer (cam unit of the drive unit and a drive pin of a blade delay-drive unit), which is arranged at the end of the arm in parallel with the optical axis O2. The blade-drive pin 128d in the mounted state is inserted into the elongated hole 131d of the unit base 131 so as to protrude upward.

The first shutter blade 132 and the second shutter blade 133 are blades for opening and shutting the base opening 131a for passing a photographing luminous flux through opening 131a and the diaphragm opening 134a of the unit cover 134 by the rotation from the retracted position to the exclusion position in cooperation with each other.

The first shutter blade 132 is provided with a rotation pin hole 132b, an engaging hole 132d for receiving a shutter-blade delay drive unit, a front edge 132a for opening and shutting the opening 131a, and a rear edge 132c.

The second shutter blade 133 is provided with a rotation pin hole 133b, an engaging elongated hole (engaging hole) 133d serving as a cam unit of a shutter-blade drive unit, a front edge 133a for opening and shutting the opening 131a, and a rear edge 133c.

The engaging hole 132d of the first shutter blade 132 is a hole having predetermined clearances (allowances) relative to the blade-drive pin 128d of the blade-drive arm 128 in the rotational direction of the first shutter blade 132 and a direction orthogonal thereto. That is, hole 132d may be referred to as a hole having allowances in the moving direction of the blade-drive pin 128d. The engaging hole 133d of the second shutter blade 133 has a groove width scarcely having a clearance relative to the blade-drive pin 128d of the blade-drive arm 128 in the rotational direction.

The first and second shutter blades 132 and 133 are assembled by placing them on the first plane 131e of the unit base 131 in a state of overlapping in the optical axial direction O2. In this assembled state, the first shutter blade 132 is attached such that the blade-support pin 131b of the unit base 131 is rotatably fitted into the pin hole 132b while the blade-drive pin 128d of the blade-drive arm 128 is inserted into the engaging hole 132d. Also, the second shutter blade 133 is attached such that the blade-support pin 131b is rotatably fitted into the pin hole 133b while the blade-drive pin 128d is slidably fitted into the engaging elongated hole 133d.

In addition, the shapes and operation of the first and second shutter blades 132 and 133 will be described later in detail.

The unit cover 134 is provided with the diaphragm opening 134a aligned with the optical axis O2, positioning pin holes 134b and 134c, a clearance hole 134d, and retaining holes 134i and 134j formed in two respective raised portions. The unit cover 134 is abutted on the second plane 131f of the unit base 131 above the shutter blades 132 and 133 such that the blade-drive pin 128d is inserted into the clearance hole 134d while the blade-support pin 131b and the positioning pin 131c are further inserted into the positioning pin holes 134b and 134c, respectively, so as to be positioned in the optical axial direction O2 and a direction orthogonal thereto. In the state described above, the unit cover 134 is mounted such that the retaining holes 134i and 134j of the unit cover 134 are respectively retained to the retaining projections 131i and 131j of the unit base 131.

In the shutter unit 116 assembled as described above, between the unit cover 134 and the unit base 131, the first and second shutter blades 132 and 133 are maintained in a state capable of opening and shutting in the same direction. In addition, since the shutter unit 116 is arranged so that its perimeter falls within the perimeter of the unit base 131 when projected on to the unit base, an occupied area on a plane orthogonal to the optical axis O2 is thus determined by the unit base 131.

Next, the shape and the opening and shutting operation of the shutter blades in the shutter unit 116 structured as described above will be described in detail with reference to FIGS. 14 to 17C.

Figure 14:
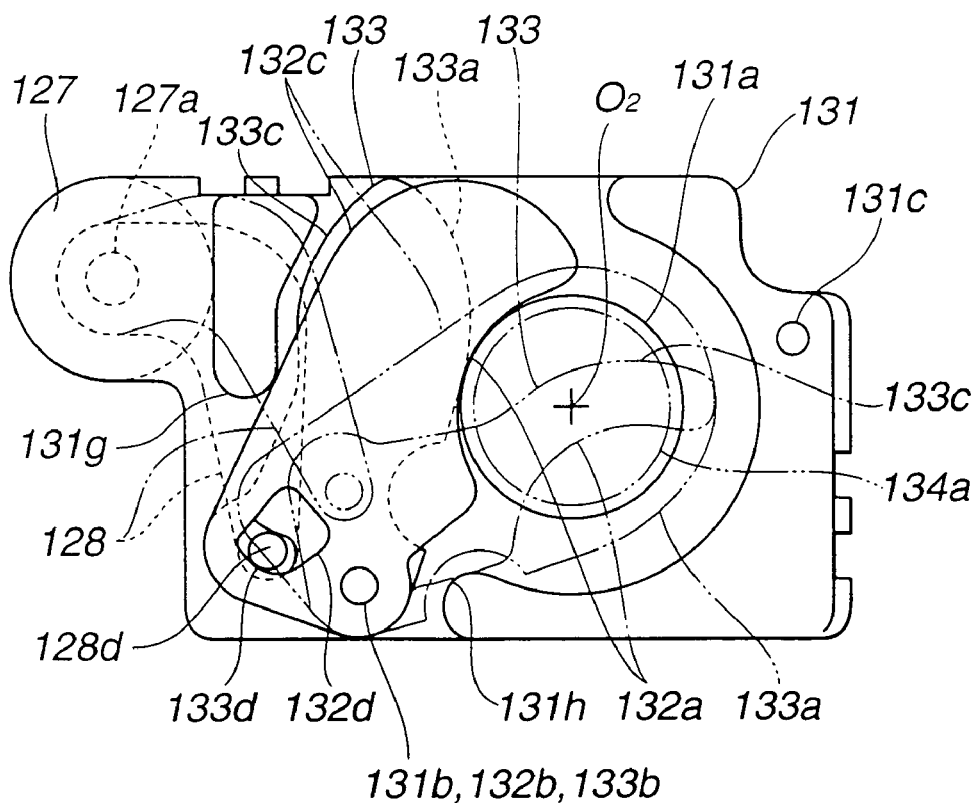
FIG. 14 is a plan view showing an opening and closing state of a diaphragm opening in the shutter unit shown in FIG. 12.
Figure 15A:
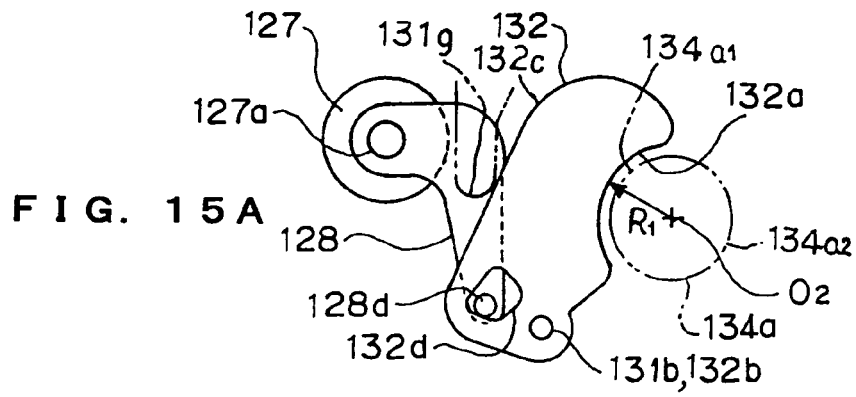
FIG. 15A is a plan view showing an opened state of a first shatter blade located at a retracted position in an opening and shutting state independently operated by the first shutter blade in the shutter unit shown in FIG. 12.
Figure 15B:
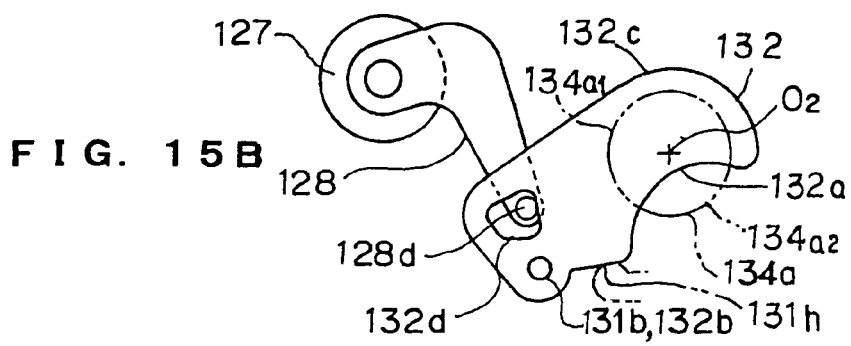
FIG. 15B is a plan view showing a shut state of the first shatter blade located at a shielding position in the opening and shutting state independently operated by the first shutter blade in the shutter unit shown in FIG. 12.
Figure 16A:
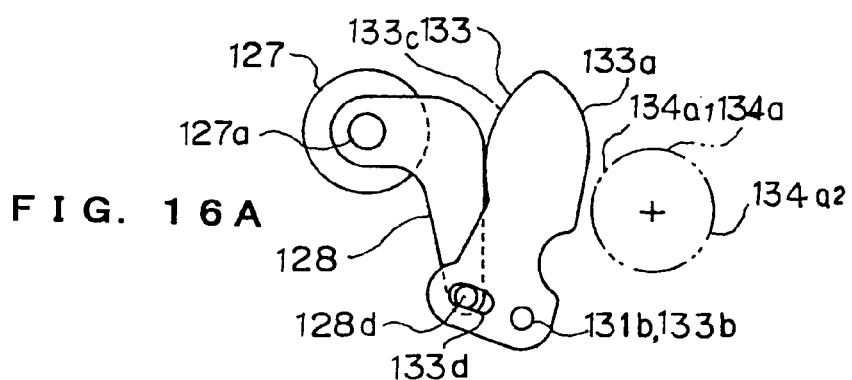
FIG. 16A is a plan view showing an opened state of a second shatter blade located at a retracted position in an opening and shutting state independently operated by the second shutter blade in the shutter unit shown in FIG. 12.
Figure 16B:
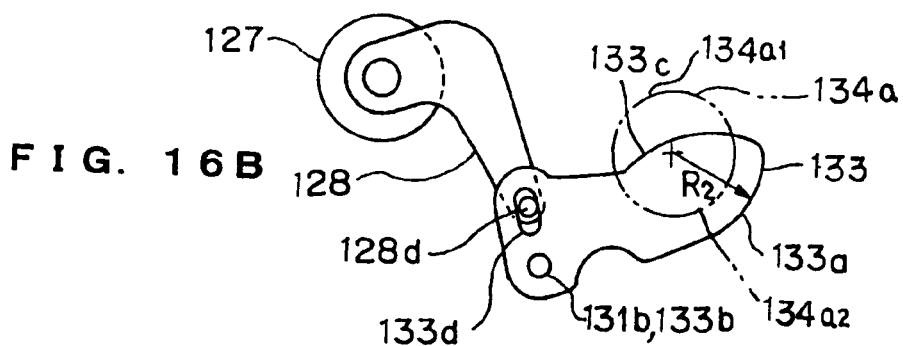
FIG. 16B is a plan view showing a shut state of the second shatter blade located at a shielding position in the opening and shutting state independently operated by the second shutter blade in the shutter unit shown in FIG. 12.
Figure 17A:
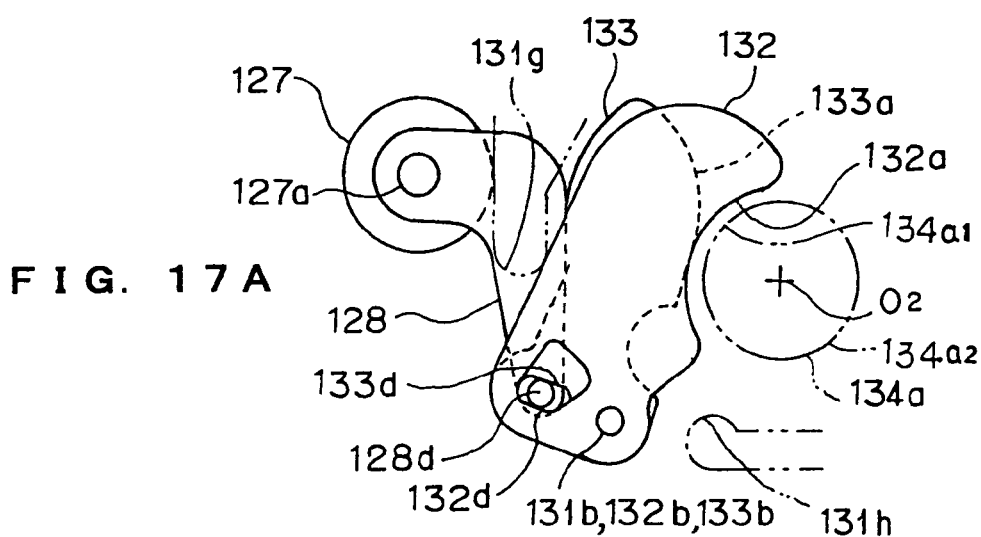
FIG. 17A is a plan view showing an opened state (retracted state) in changes of a diaphragm opening from an opened state to a closed state operated by the first and second shutter blades in the shutter unit shown in FIG. 12.
Figure 17B:
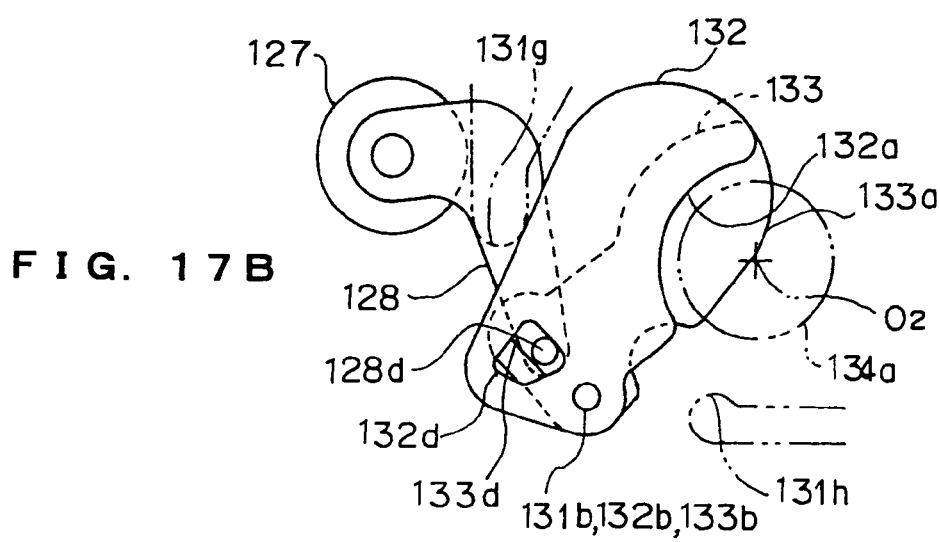
FIG. 17B is a plan view showing a partly opened state in changes of the diaphragm opening from the opened state to the closed state operated by the first and second shutter blades in the shutter unit shown in FIG. 12.
Figure 17C:
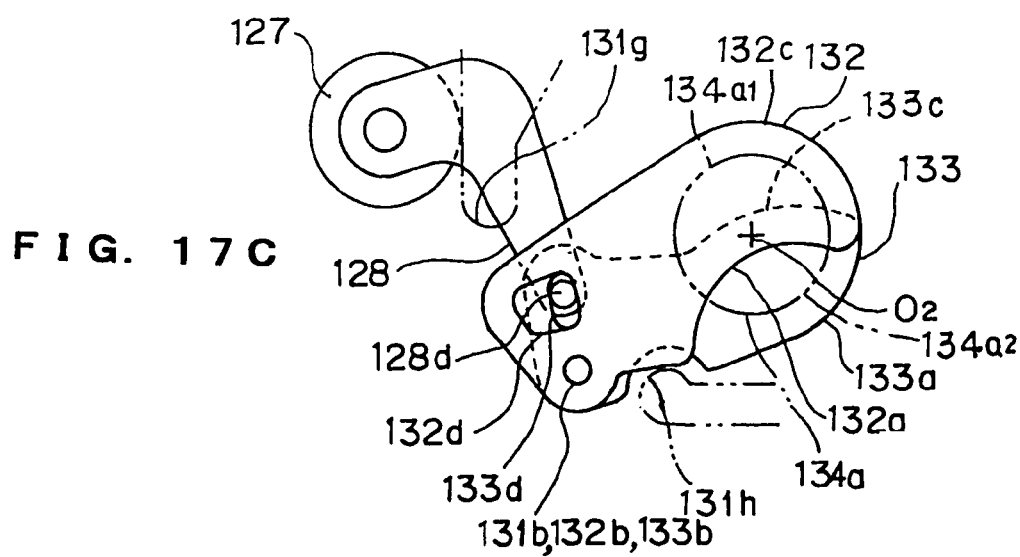
FIG. 17C is a plan view showing a shut state (shielded state) in changes of the diaphragm opening from the opened state to the closed state operated by the first and second shutter blades in the shutter unit shown in FIG. 12.

FIGS. 14 to 17C are plan views of the state of the shutter blades viewed from the incident side of the optical axis O2; FIG. 14 is a plan view showing the opening and shutting state of the diaphragm opening by the shutter blades. FIGS. 15A and 15B are plan views showing the opening and shutting state of the first shutter blade by it self; wherein FIG. 15A shows the opened state at the retracted position of the first shutter blade; and FIG. 15B shows the shut state at the shielding position of the first shutter blade. FIGS. 16A and 16B are plan views showing the opening and shutting state of the second shutter blade by it self; wherein FIG. 16A shows the opened state at the retracted position of the second shutter blade; and FIG. 16B shows the shut state at the shielding position of the second shutter blade. FIGS. 17A, 17B, and 17C are plan views showing changes from the opened state to the shut state of the diaphragm opening by the first and second shutter blades; wherein FIG. 17A shows the opened state (retracted-position state of the shutter blade); FIG. 17B shows the mid state of the opening and shutting; and FIG. 17C shows the shut state (shielded-position state of the shutter blade).

In addition, in FIG. 14, the solid line and the broken line of the first and second shutter blades denote retracted positions; the double-dotted chain line of the first and second shutter blades denotes a shielding position; the broken line of the blade drive arm denotes an opening drive position (retracted position); and the double-dotted chain line of the blade drive arm denotes a shutting drive position (shielding position).

The blade-drive arm 128 of the shutter actuator 127 is rotated in a predetermined range from the opening drive position (retracted position) shown in FIGS. 15A and 15B to the shutting drive position (shielding position) shown in FIGS. 15B and 16B. By the blade-drive arm 128, the first shutter blade 132 is rotationally driven from the retracted position shown in FIG. 15A to the shielding position shown in FIG. 15B via the blade-drive pin 128*d* inserted into the engaging hole 132*d*.

Since in the first shutter blade 132, the engaging hole 132*d* has an allowance in the rotational direction relative to the blade-drive pin 128*d* as described above, the practical rotation angle of the opening and shutting rotation of a predetermined angle is smaller than that of the second shutter blade 133 without an allowance. By the difference in the rotational angle, the first shutter blade 132 and the second shutter blade 133, which are accommodated in an overlapped state at the retracted position, are moved to different positions so as to shield the diaphragm opening 134*a* in a divided state.

Since the engaging hole 132*d* provides an allowance of movement of pin 128*d* in the rotational direction, the first shutter blade 132 is held at the retracted position or the shielding position by abutting a stopper 131*g* of the unit base 131 when being located at the retracted position and the shielding position. That is, when the first shutter blade 132 is located at the retracted position, the blade-drive pin 128*d* abuts the external end of the engaging hole 132*d* while the rear end-face of the first shutter blade 132 is maintained to abut the first stopper 131*g* of the unit base 131, so that the first shutter blade 132 is positioned at the retracted position (FIG. 15A).

In the state that the first shutter blade 132 is clockwise rotated from the retracted position to the shielding position, the blade-drive pin 128*d* abuts the internal end of the engaging hole 132*d* while the front end-face of the first shutter blade 132 is maintained to abut a second stopper 131*h* of the unit base 131, so that the first shutter blade 132 is positioned at the shielding position (FIG. 15B).

On the other hand, since the engaging hole 133*d* does not provide an allowance relative to the blade-drive pin 128*d*, the second shutter blade 133 is positioned directly and exclusively at the retracted position and the shielding position by the rotation of the blade-drive arm 128 (FIGS. 16A and 16B).

The front edge 132*a* of the first shutter blade 132, as shown in FIG. 15A, has a concave shape so as to retract along a vicinity 134*a*1 of the diaphragm opening 134*a* on the retraction side when being located at the retracted position. A radius R1 about the optical axis O2 of curvature of the concave shape is set larger than the radius of the diaphragm opening 134*a* by a predetermined size, so that at the retracted position, the first shutter blade 132 can be securely retracted from the vicinity 134*a*1 of the diaphragm opening 134*a*. The rear edge 132*c* of the first shutter blade 132, as shown in FIG. 15B, has a convex shape covering the vicinity 134*a*1 of the diaphragm opening 134*a* when being located at the shielding position.

The front edge 133*a* of the second shutter blade 133, as shown in FIG. 16B, has a convex shape covering a vicinity 134*a*2 remote from the diaphragm opening 134*a* on the retracted side when being located at the shielding position. A radius R2 about the optical axis O2 of curvature of the convex shape is set substantially the same as the radius R1 of the front edge 132*a* as well as being larger than the radius of the diaphragm opening 134*a* by a predetermined size, so that at the shielding position, the second shutter blade 133 can securely cover the vicinity 134*a*2 of the diaphragm opening 134*a*. In addition, the front edge 133*a*, as shown in FIG. 16A, is retracted from the diaphragm opening 134*a* at the retracted position.

Also, the rear edge 133*c* of the second shutter blade 133 having a convex shape, as shown in FIG. 17C, is held in a state overlapping with the front edge 132*a* of the first shutter blade 132 at the shielding position.

The opening and shutting operation of the diaphragm opening 134*a* of the unit cover 134 by the first and second shutter blades 132 and 133 will be described. As shown in FIG. 17A, when the blade-drive arm 128 is located at an opening drive position, the first shutter blade 132 is rotationally driven counterclockwise by the blade-drive pin 128*d* of the blade-drive arm 128 via the engaging hole 132*d* so as to abut the first stopper 131*g* of the unit base 131 in the retracted position. On the other hand, the second shutter blade 133 is rotationally driven counterclockwise by the blade-drive pin 128*d* via the engaging elongated hole 133*d* so as to locate at the same retracted position. In this retracted state, the front edge 132*a* of the first shutter blade 132 and the front edge 133*a* of the second shutter blade 133 are retracted from the vicinity 134*a*1 of the diaphragm opening 134*a* of the unit cover 134, and so that the first shutter blade 132 is overlapped with the second shutter blade 133.

When the blade-drive arm 128 is rotationally driven in a direction of a shutting drive position, as shown in FIG. 17B, the second shutter blade 133 is rotationally driven clockwise so as to shield the center of the diaphragm opening 134*a* with the front edge 133*a*. However, since the engaging hole 132*d* has an allowance relative to the blade-drive pin 128*d*, the first shutter blade 132 does not start rotation and is maintained at the retracted position.

If the blade-drive arm 128 is rotationally driven further so as to reach the shutting drive position, as shown in FIG. 17C, the second shutter blade 133 is rotationally driven until the front edge 133*a* reaches the shielding position of the diaphragm opening 134*a*. On the other hand, the first shutter blade 132 is clockwise rotated by the blade-drive pin 128*d* via the engaging hole 132*d* so as to chase the leading second shutter blade 133 until abutting the second stopper 131*h* of the unit base 131. The angle of rotation of the first shutter blade 132 from the retracted position to the shielding position is smaller than that of the second shutter blade 133 as determined by the allowance of the engaging hole 132*d*.

In this shielding state, the vicinity 134*a*1 of the diaphragm opening 134*a* is covered with the rear edge 132*c* of the first shutter blade 132. Then, the central portion of the diaphragm opening 134*a* is covered with the rear edge 133*c* of the second shutter blade 133 in an overlapped state with the front edge 132*a* of the first shutter blade 132. Furthermore, the vicinity 134*a*2 of the diaphragm opening 134*a* is covered with the front edge 133*a* of the second shutter blade 133. In such a manner, in the shutter shut state, the diaphragm opening 134*a* is shielded in a state divided by the first and second shutter blades 132 and 133 in cooperation.

Upon photographing with the camera 101 according to the embodiment housing the shutter unit 116 described above therein, first, the lens device 120 is set in a desired zooming state by driving the zoom frame 115 back and forth in the optical axial direction O2. During zooming, the focus frame 118 is also moved to a corresponding position. The first and second shutter blades 132 and 133 are maintained at the retracted position retracted from the diaphragm opening 134*a* (FIGS. 14 and 17A). Also, by a light-measuring unit (not shown), the object brightness is measured so as to bring the brightness data into the control circuit.

Continuously, in accordance with the pushing of the release button 105, the focus frame 118 is driven back and forth for focusing so that a subject luminous flux image is formed on the CCD 123. The object images are converted into electric photographing signals by the CCD 123. After a lapse of period of time corresponding to the object brightness, the first and second shutter blades 132 and 133 are rotationally driven to the shielding position covering the diaphragm opening 134a as shown in FIG. 17C so as to block the object luminous flux from reaching the CCD 123.

The signals are converted into digital image signals under the control of the CPU so as to finish the photographing after the digital signals are stored in a memory.

In the shutter unit 116, which is the optical apparatus in the camera 101 according to the embodiment described above, the rotational axes of the first and second shutter blades 132 and 133, which is a plurality of shutter blades, are supported by the one blade-support pin 131b, and the first and second shutter blades 132 and 133 are further rotationally driven by the single blade-drive pin 128d as a drive retainer. Also, the diaphragm opening 134a is shielded with the first and second shutter blades 132 and 133 in cooperation, and the first and second shutter blades 132 and 133 are arranged to overlap with each other in the retracted state thereof. Also, the shutter actuator 127 for driving the shutter blade is located on the retracted side of the shutter blade. Therefore, according to the shutter unit 116, the structure is simplified, and moreover the occupied area in a direction orthogonal to the optical axis O2 can be reduced. Also, the unit base 131 and the unit cover 134 for accommodating the shutter unit 116 is more compact, enabling the zoom frame 115 and the focus frame 118 to fall within an area in a direction orthogonal to the optical axis O2, for example, for further miniaturizing the camera.

In the first shutter blade 132, which is to be retracted from the retracted side of the diaphragm opening 134a among the first and second shutter blades 132 and 133, the front edge is concave-shaped, while in the second shutter blade 133, the front edge to cover the counter retracted side of the diaphragm opening 134a is convex-shaped, so that the occupied space for the first and second shutter blades 132 and 133 can be reduced by eliminating the unnecessary portion protruding outward from the diaphragm opening 134a in the shielding state, enabling the shutter unit 116 to also be more compact in this respect. For example, if two concave shutter blades might be applied as in a conventional shutter unit, the protruding portion formed by the concave portion is protruded outward in the shielding state, increasing the occupied space.

In the arrangement of the shutter actuator 127, by arranging the zoom frame 115 and the focus frame 118 in the vicinity of one guide shaft, the dead space produced in the lens device 120 housing the shutter unit 116 can be reduced.

In addition, according to the second embodiment described above, the digital camera is exemplified; alternatively, the optical apparatus according to the present invention may be incorporated in silver film cameras and camera units housed in a mobile telephone and a PDA, so that the camera, the mobile telephone, and the PDA can be miniaturized.

Furthermore, to light-exclusion members constituting the shutter unit 116, which is the optical apparatus, two-blade shutter blades are incorporated; alternatively, a shutter unit using two or more blades for opening and shutting a diaphragm opening in cooperation may incorporate the present invention.

As described above, according to the optical apparatus of the second embodiment of the present invention, a plurality of light-excluding members have a rotation axis and a drive retainer for driving them in common, so that the optical apparatus is miniaturized. Also, one blade for shielding a portion remote from the retracted position of the diaphragm opening is convex shaped, so that the optical apparatus can be made more compact by eliminating an additional protruding portion in the shielding state.

Furthermore, according to the camera of the second embodiment of the present invention, since the optical apparatus described above is incorporated therein, the miniaturization of the camera can be achieved.

Moreover, according to the optical apparatus (shutter unit) of the second embodiment, since two shutter blades are sequentially driven, not simultaneously, a heavy load is not applied to the rotary solenoid as a driving source, not requiring the rotary solenoid itself to be increased in size. Also, elements in the electric circuit can use comparatively inexpensive components so as to have a degree of freedom in design. As a result, the optical instrument itself need not increase in size, achieving the miniaturizing of the optical instrument.

Figure 18:
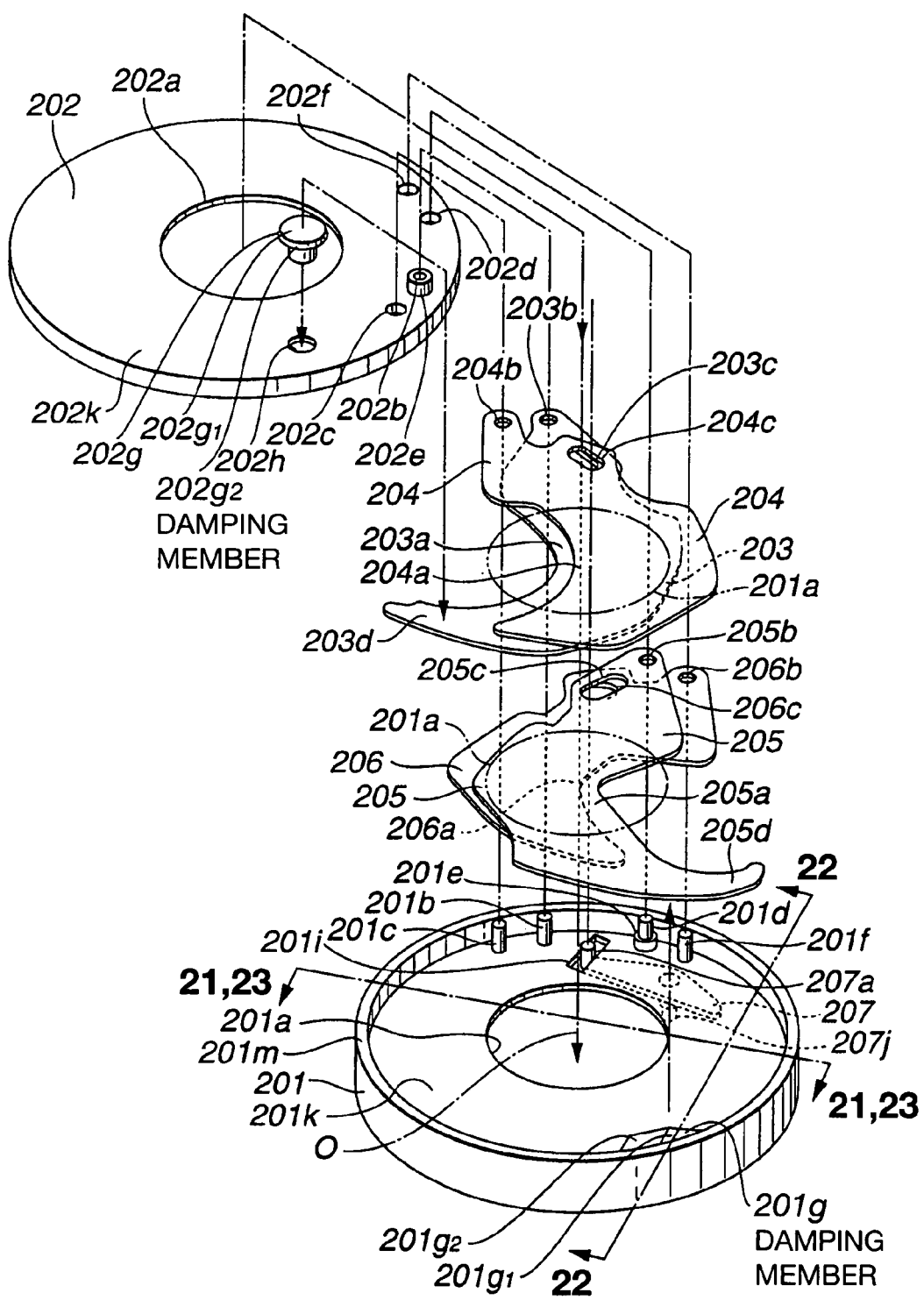
FIG. 18 is an exploded perspective view of a shutter device according to a third embodiment of the present invention.
Figure 19:
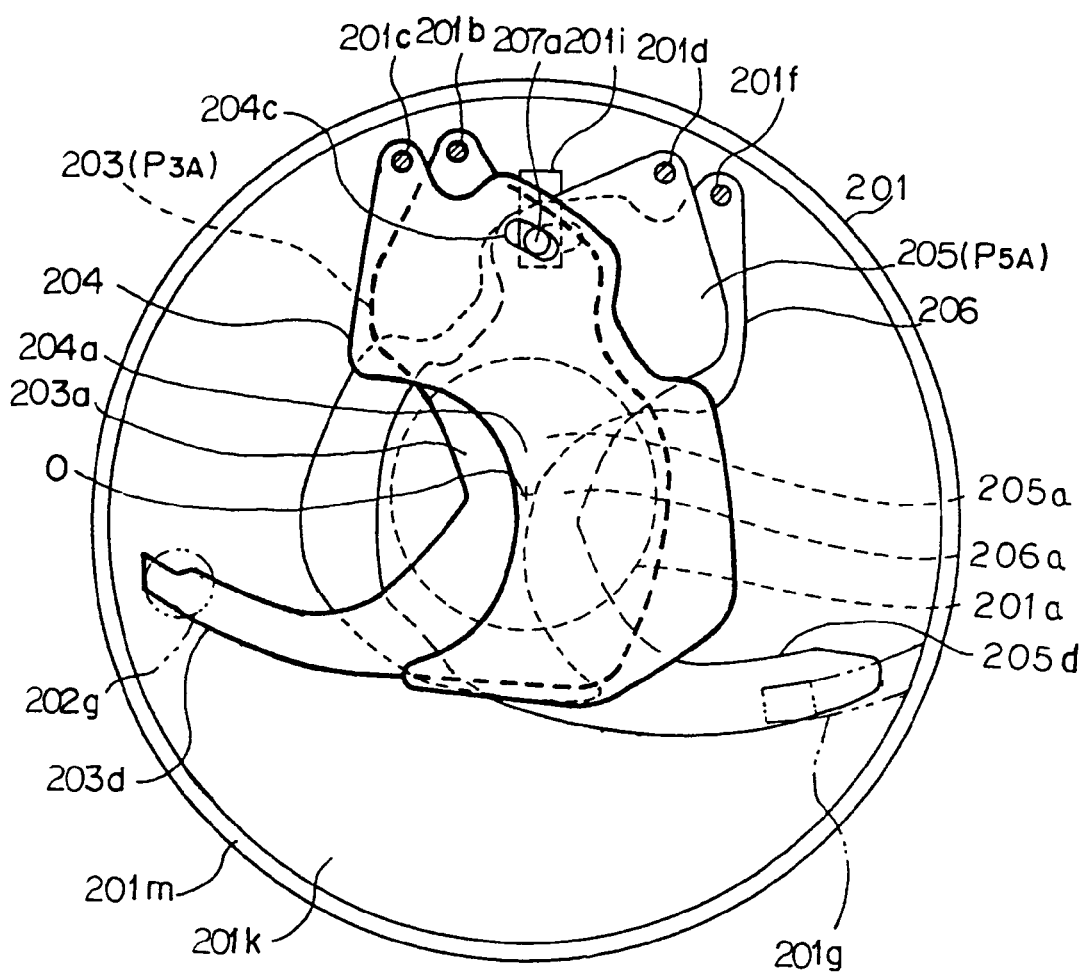
FIG. 19 is a plan view of the shutter device shown in FIG. 18 in a state that a case lid is removed and viewed from the incident side showing primary and secondary blades in a shut state of the shutter.
Figure 20:
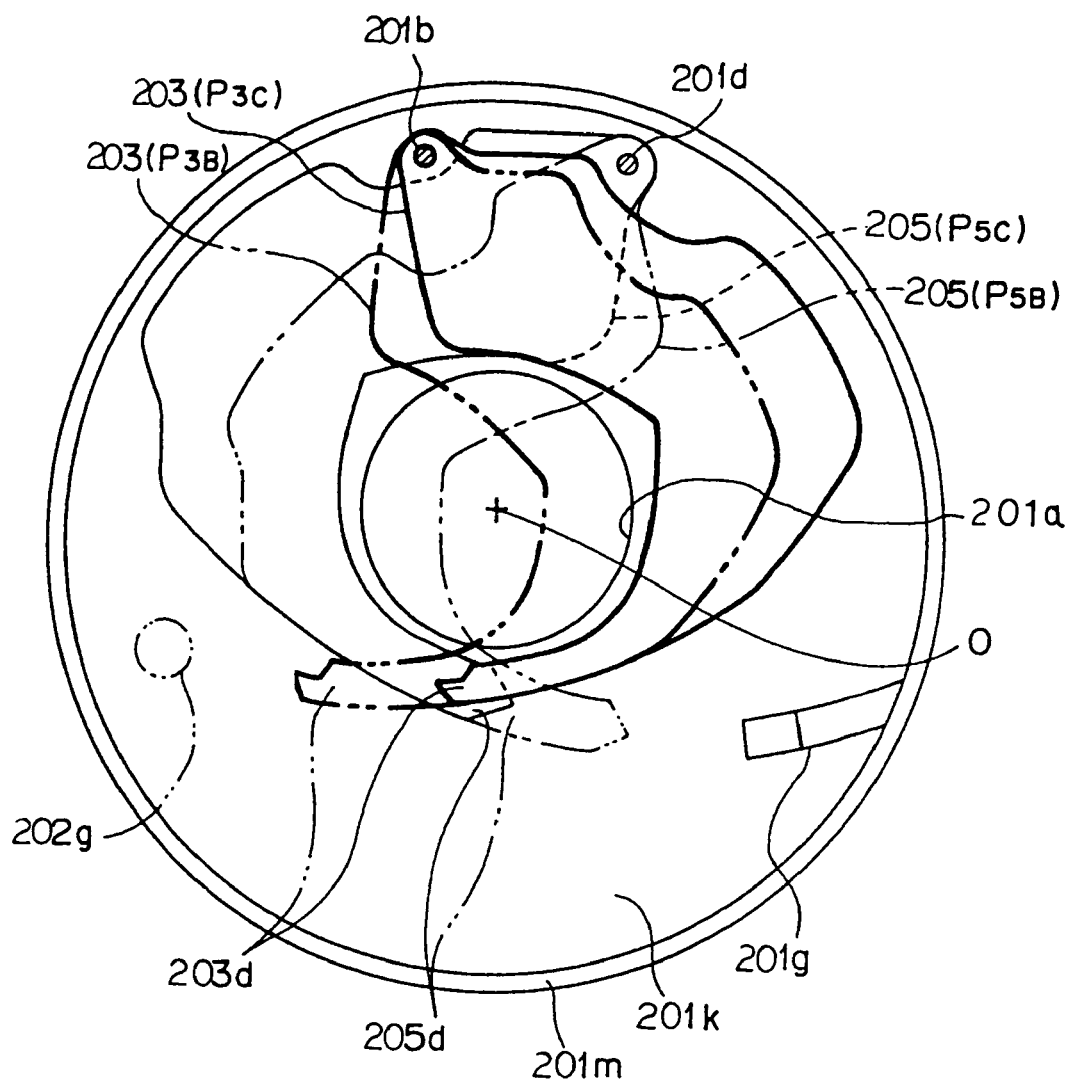
FIG. 20 is a plan view of the shutter device shown in FIG. 18 in a state that the case lid is removed and viewed from the incident side showing only the primary blade in an opened state of the shutter.
Figure 21:
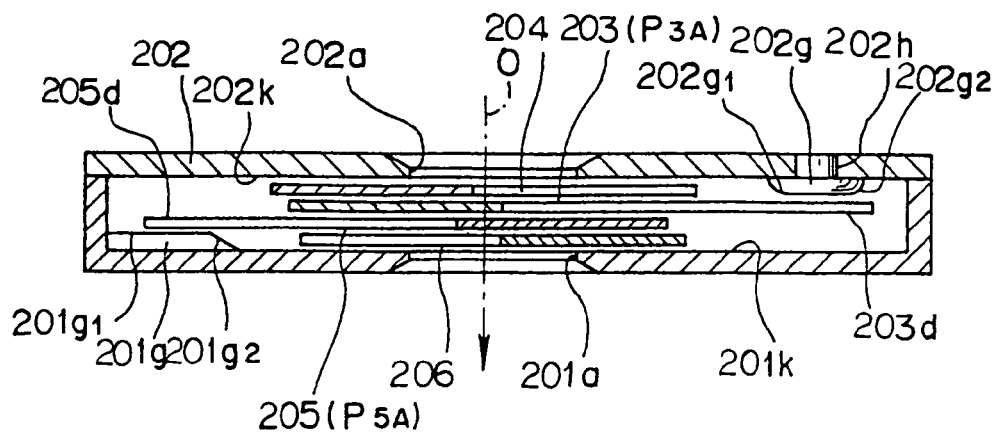
FIG. 21 is a sectional view looking in the direction of arrows 21—21 of FIG. 18 showing the shutter device in a shut state of the shutter.
Figure 22:
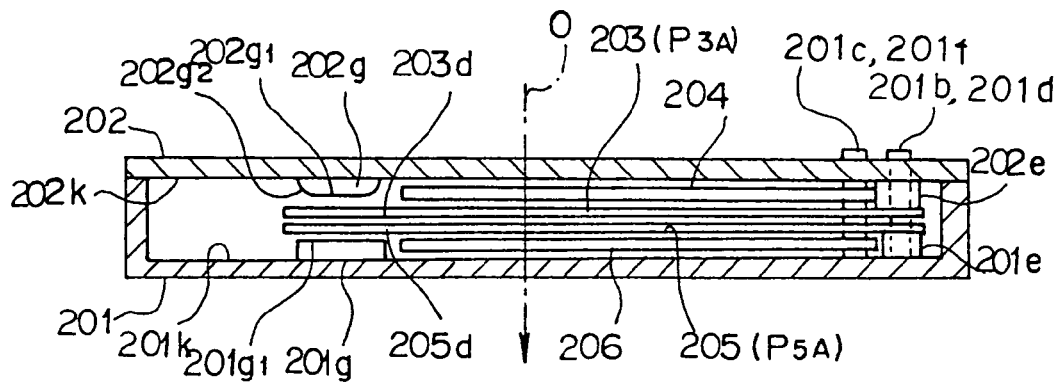
FIG. 22 is a sectional view looking in the direction of arrows 22—22 of FIG. 18 showing the shutter device in the shut state of the shutter.
Figure 23:
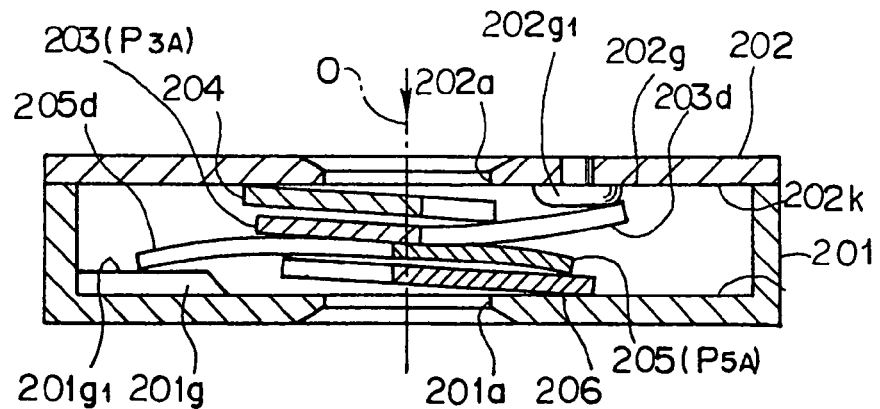
FIG. 23 is a sectional view looking in the direction of arrows 23—23 of FIG. 18 schematically showing a displacing state of each shutter blade reaching a shut position of the shutter by enlarging the size in an optical axial direction O.

FIG. 18 is an exploded perspective view of a shutter device according to a third embodiment of the present invention; FIG. 19 is a plan view of the shutter device viewed from the incident side in the state that a case lid is removed from the shutter device showing primary and secondary blades in the shut state; FIG. 20 is a plan view of the shutter device also viewed from the incident side in the state that the case lid is removed from the shutter device showing only the primary blade in the opened state of the shutter; FIG. 21 is a sectional view at the line 21—21 of FIG. 18 showing the shut state of the shutter device; FIG. 22 is a sectional view at the line 22—22 of FIG. 18 showing the same shut state of the shutter device; and FIG. 23 is a sectional view at the line 23—23 of FIG. 18 schematically showing the dynamic displacement of the shutter blades when the device reaches the shutter shut position by enlarging the size in an optical axial direction O.

In the description below, symbol O denotes an optical axis of an object luminous flux passing through the shutter device. Also, the incident side of the object luminous flux is represented by the upside of the shutter device while the emission side is represented by the downside of the shutter device. Also, the rotating direction is indicated by the direction when viewed from the upside.

The shutter device according to the embodiment can be applied to a shutter device such as a camera. The shutter device, as shown in FIG. 18, is mainly composed of a shutter case 201 fixed to a mirror frame (not shown) as a support member; a case lid 202; two pairs of a primary blade 203, a secondary blade 204, a primary blade 205, and a secondary blade 206, which are four shutter blades (sectors) for opening and shutting an exposure opening in cooperation; and a shutter drive lever 207 including a drive pin 207a.

The shutter case 201 includes an internal surface portion 201k, which is the upper surface of case 201 orthogonal to the optical axis O for forming a blade accommodating space; an exposure opening 201a formed in the internal surface portion 201k for passing an object luminous flux therethrough; an insertion hole 201i for the drive pin 207a of the shutter drive lever 207; and an abutting end-face 201m. Furthermore, the shutter case 201 also includes support pins 201b, 201c, 201d, and 201f arranged on the internal surface portion 201k for rotatably supporting each of the blades; a damping member 201g fixed on the same internal surface portion 201k; and a lever-support pin 207j arranged on the bottom surface of the internal surface portion 201k for rotatably supporting the shutter drive lever 207.

In addition, the support pin 201d has a step portion 201e for supporting the vicinity of a rotation-support hole 205b of the primary blade 205 in the optical axial direction O.

The damping member 201g is a kinetic energy-absorbing member made of a rubber vibration insulator, such as SORBOTHANE (TRADEMARK, Sorbothane Inc.) and HANENAITO (TRADEMARK, Naigai Rubber Industry Co. Ltd), which are shock absorbing materials. The damping member 201g, having a flat plane 201g1 extending along a surface orthogonal to the optical axis O and an inclined surface 201g2, is fixed to the shutter case 201 with adhesion or press-fitting. In the above fixed state, the flat plane 201g1 of the damping member 201g is arranged in the vicinity of the closed end of the rotational movement trajectory of an extended projection 205d, which will be described later, of the primary blade 205 at a position outside the movement trajectory and lower in a direction perpendicular to the blade moving direction with a slight clearance (FIGS. 21 and 22).

The case lid 202 includes an internal surface 202k formed on the bottom surface (upper surface in FIG. 18) orthogonal to the optical axis O for forming the blade-accommodating space; an opening 202a formed on the internal surface 202k for passing an object luminous flux therethrough; and shaft holes 202b, 202c, 202d, and 202f for fitting the support pins 201b, 201c, 201d, and 201f thereinto. The case lid 202 is further provided with a damping member 202g fixed on the internal surface portion 201k, and is assembled by abutting the abutting end-face 201m.

In addition, the shaft hole 202b is a shaft hole formed above a support boss 202e disposed in the vicinity of a rotation support hole 203b of the primary blade 203 in the optical axial direction.

Also, the damping member 202g is a kinetic energy-absorbing member made of a rubber vibration insulator similar to the damping member 201g. The damping member 202g, having a circular flat plane 202g1 extending along a surface orthogonal to the optical axis O with a smoothly chamfered inclined peripheral surface 202g2, is fixed to a mounting hole 202h of the case lid 202 with adhesion or press-fitting. In the above mounting state, the flat plane 202g1 of the damping member 202g is arranged in the vicinity of the closed end of the rotational movement trajectory of an extended projection 203d, which will be described later, of the primary blade 203 at a position outside the movement trajectory and lower in a direction perpendicular to the blade moving direction with a slight clearance (FIGS. 21 and 22).

The primary blade 203 is provided with an opening shielding portion 203a, the rotation support hole 203b rotatably fitted to the support pin 201b, an elongated hole 203c fitted to the drive pin 207a for driving the rotation, the extended projection 203d disposed at a position outside the opening shielding portion and extending in the closed rotation direction. The secondary blade 204 is also provided with an opening shielding portion 204a, a rotation support hole 204b rotatably fitted to the support pin 201c, and an elongated hole 204c fitted to the drive pin 207a for driving the rotation.

On the other hand, the primary blade 205 is provided with an opening shielding portion 205a, a rotation support hole 205b rotatably fitted to the support pin 201d, an elongated hole 205c fitted to the drive pin 207a for driving the rotation, and the extended projection 205d disposed at a position outside the opening shielding portion and extending in the closed rotational direction. Also, the secondary blade 206 is provided with an opening shielding portion 206a, a rotation support hole 206b rotatably fitted to the support pin 201f, and an elongated hole 206c fitted to the drive pin 207a for driving the rotation.

The shutter drive lever 207 is rotatably supported by the lever-support pin 207j of the shutter case 201, and is rotationally driven by a known shutter driving solenoid and a drive-lever returning spring, which are not shown, so as to open and shut the shutter blade. That is, if the solenoid is turned on (sucking state), the primary and secondary blades 203, 204, 205, and 206 are opened and driven by the shutter drive lever 207 via the drive pin 207a. If the solenoid is turned off, the blades are driven by the shutter drive lever 207 in the shutting direction with an abutting force of the returning spring of the solenoid.

The four primary and secondary blades 203, 204, 205, and 206, as shown in FIGS. 19 and 20, are rotatably supported in the internal space formed of the shutter case 201 and the case lid 202 about each of the support pins 201f, 201d, 201b, and 201c as supporting points in the state overlapping the blades 206, 205, 203, and 204 in this order from the opening 201a (downside). At the opening and shutting positions, the vertical overlapping relationship in the optical axial direction O is maintained over the entire rotational range with the overlapping of the extended projections 203d and 205d of the primary blades 203 and 205.

In the primary blade 203, the periphery of the rotation support hole 203b is held at a predetermined distance spaced from the internal surface of the case lid 202 with the support boss 202e of the shaft hole 202b, and the movement toward the secondary blade 204 is constantly restricted (FIG. 22). Also, in the primary blade 205, the periphery of the rotation-support hole 205b is held at a predetermined distance spaced from the internal surface of the shutter case 201 with the step portion 201e of the support pin, and the movement toward the secondary blade 206 is constantly restricted (FIG. 22).

When the primary blades 203 and 205 are located at shut positions P3A and P5A, respectively (FIG. 19), the extended projections 203d and 205d of the primary blades 203 and 205 are located at positions opposing the flat planes 202g1 and 201g1 of the damping members 202g and 201g in the optical axial direction O, respectively. The clearance in the optical axial direction O is a slight suitable clearance in that the primary blades 203 and 205 can rotate without resistance in a statically opening and shutting moving state without displacement due to the rebound (FIGS. 19, 21, and 22) as well as the extended projections 203d and 205d abut the damping members 202g and 201g by the displacement due to the rebound produced when the primary blades 203 and 205 or the secondary blades 204 and 206 respectively reach the terminal end position with the shutter closed, (FIG. 23). The above-mentioned displacement includes displacement and deformation due to the backlash shown in FIG. 23, and by the displacement component in a direction perpendicular to the moving direction among them, the extended projections 203d and 205d abut the damping members 202g and 201g, respectively.

When the primary blades 203 and 205 are located at between partly opened shutter positions P3B and P5B and opened shutter position P3C and P5C, respectively (FIG. 20), the primary blades 203 and 205 and the secondary blades 204 and 206 are arranged rotatably without resistance in a sandwiched state between the internal surface portion 201k of the shutter case 201 and the internal surface 202k of the case lid 202 with the above-mentioned slight suitable clearance.

Next, the opening and shutting operation of the shutter device according to the embodiment structured as above will be described.

First, in the shut state of the shutter, as shown in FIG. 19, the primary blades 203 and 205 are located at the shut positions P3A and P5A and the secondary blades 204 and 206 are also located at the same shut positions, so that the opening 201a is completely closed. The vicinities of the rotation support holes 203b and 205b of the primary blades 203 and 205 are restricted in positions in the optical axial direction O by the support boss 202e and the step portion 201e, and the extended projections 203d and 205d of the primary blades 203 and 205 are restricted in positions from the above and below by the flat planes 202g1 and 201g1 of the damping members 202g and 201g, and furthermore other portions of the primary blades 203 and 205 and the secondary blades 204 and 206 are held in a sandwiched state between the internal surface 202k of the case lid 202 and the internal surface portion 201k of the shutter case 201. In the shut state, the opening 201a is covered with the opening shielding portions 203a, 204a, 205a, and 206a arranged in the overlapped state, and are held in the optical axial direction O with a slight clearance suitable for movement without light leakage.

When the shutter drive lever 207 is clockwise rotationally driven so as to start opening the shutter, the primary blade 203, the secondary blade 204, the primary blade 205, and the secondary blade 206 are respectively rotated in the opening direction (counterclockwise or clockwise), as shown in FIG. 20, the primary blades 203 and 205 reach the opened positions P3C and P5C (blade indicated by the solid line), respectively, while the secondary blades 204 and 206 are rotated to the respective opened positions simultaneously.

After the shutter is opened, the shutter drive lever 207 is counterclockwise rotationally driven and each blade is rotated in the shutting direction so that the primary blades 203 and 205 reach the shut positions P3A and P5A, respectively, as the terminal position in the shutting direction. Simultaneously, the secondary blades 204 and 206 also reach the shut positions P3A and P5A, respectively. When the primary blades 203 and 205 reach the terminal positions (movement completion), the shutter drive lever 207 stops rapidly. The primary blades 203 and 205 and the secondary blades 204 and 206 are going to be displaced, i.e., to bound in all directions including the optical axial direction O by the kinetic energy produced in the rapid stoppage. FIG. 23 shows the state of displacement of each blade. The above-mentioned displacement includes the displacement due to the elastic deformation of the blade (bending of the plane of the blade itself so-called flexure) and the displacement due to the backlash of each fitting portion.

During the bounding of the blade, the distal ends of the extended projections 203d and 205d of the primary blades 203 and 205 are displaced in a direction perpendicular to the movement, i.e., in the optical axial direction O so as to abut the flat planes 202g1 and 201g1 of the damping members 202g and 201g, respectively. By this abutment, i.e., the collision and impact, the kinetic energy of the distal ends is absorbed by the damping member 201g. That is, the kinetic energy of the primary blades 203 and 205 is consumed. As a result, the bounding of the primary blades 203 and 205 is suppressed. Simultaneously, the vibration of the secondary blades 204 and 206 overlapped with the primary blades 203 and 205 is also deadened via the primary blades 203 and 205 so that the bounding is suppressed in the same way.

During the shutting of the shutter, when each blade reaches the terminal end position, if each shutter blade might bound, light leakage would be produced by the clearance between the blades that are once shut. Whereas, in the above-described shutter device according to the embodiment, since the bounding at the arrival time to the terminal end position is suppressed as described above, the light leakage cannot be produced so that the shutter is properly operated.

Even immediately before the shutter blade reaches the terminal end position, the distal ends of the extended projections 203d and 205d of the primary blades 203 and 205 may touch the flat planes 202g1 and 201g1 of the damping members 202g and 201g, respectively. In this case, since the moving speed is reduced toward the terminal end, the shutter speed time is scarcely affected and bounding at the stop time can be suppressed.

As described above, according to the shutter device of the third embodiment, in comparison with a conventional shutter device without a bound-preventing function, there is provided a shutter device with a small occupied space and capable of speeding up and efficiently suppressing the shutter blade bounding during the shutting operation so as to have preferable shutter operation scarcely affecting the shutter speed time by a simplified structure in that only the damping members 201g and 202g are added on internal planes of the shutter case 201 and the case lid 202 so as to oppose the extended projections of the primary blades.

Next, a shutter device according to a fourth embodiment of the present invention will be described with reference to FIGS. 24 to 28.

Figure 24:
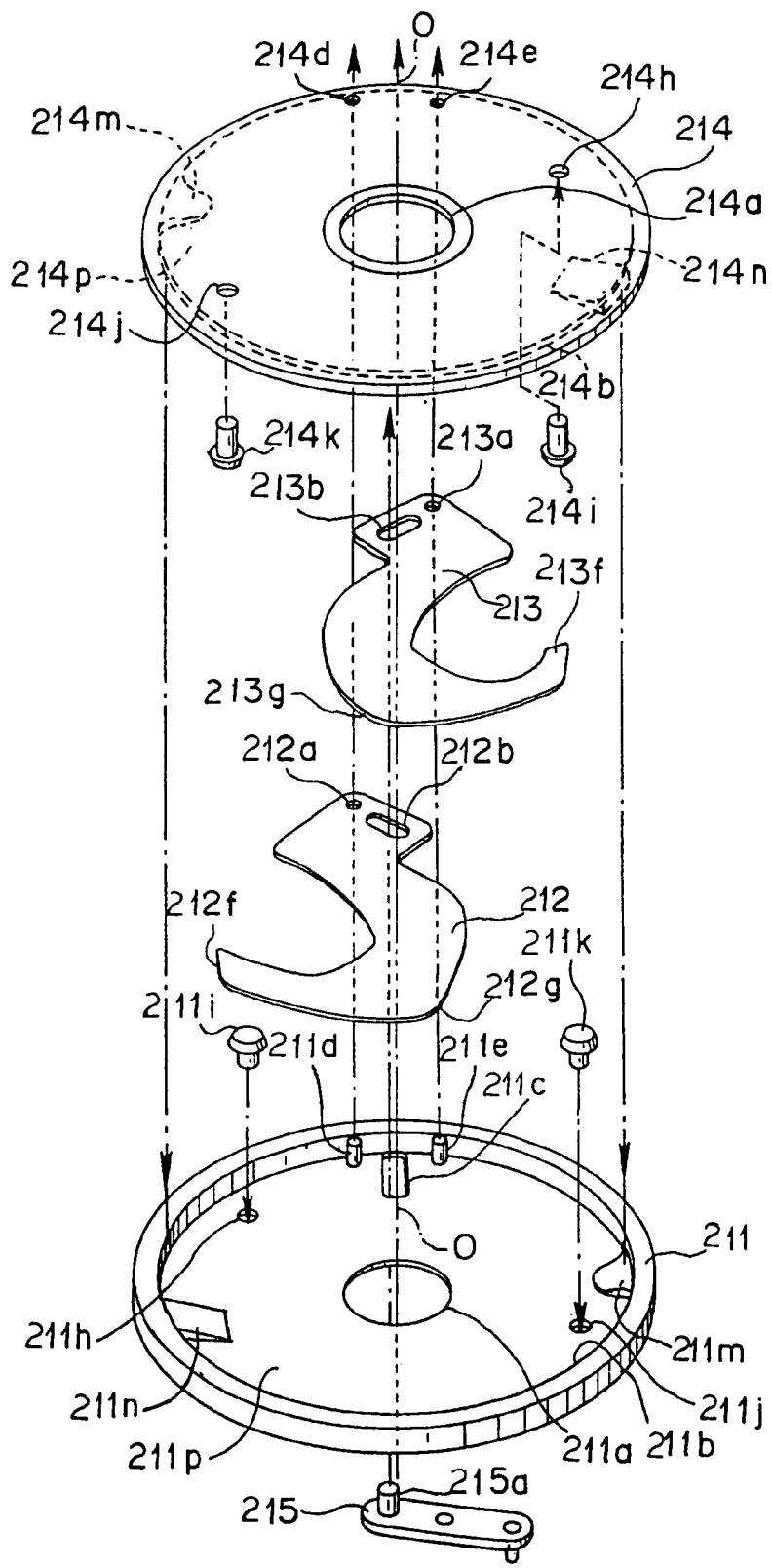
FIG. 24 is an exploded perspective view of a shutter device according to a fourth embodiment of the present invention.
Figure 25:
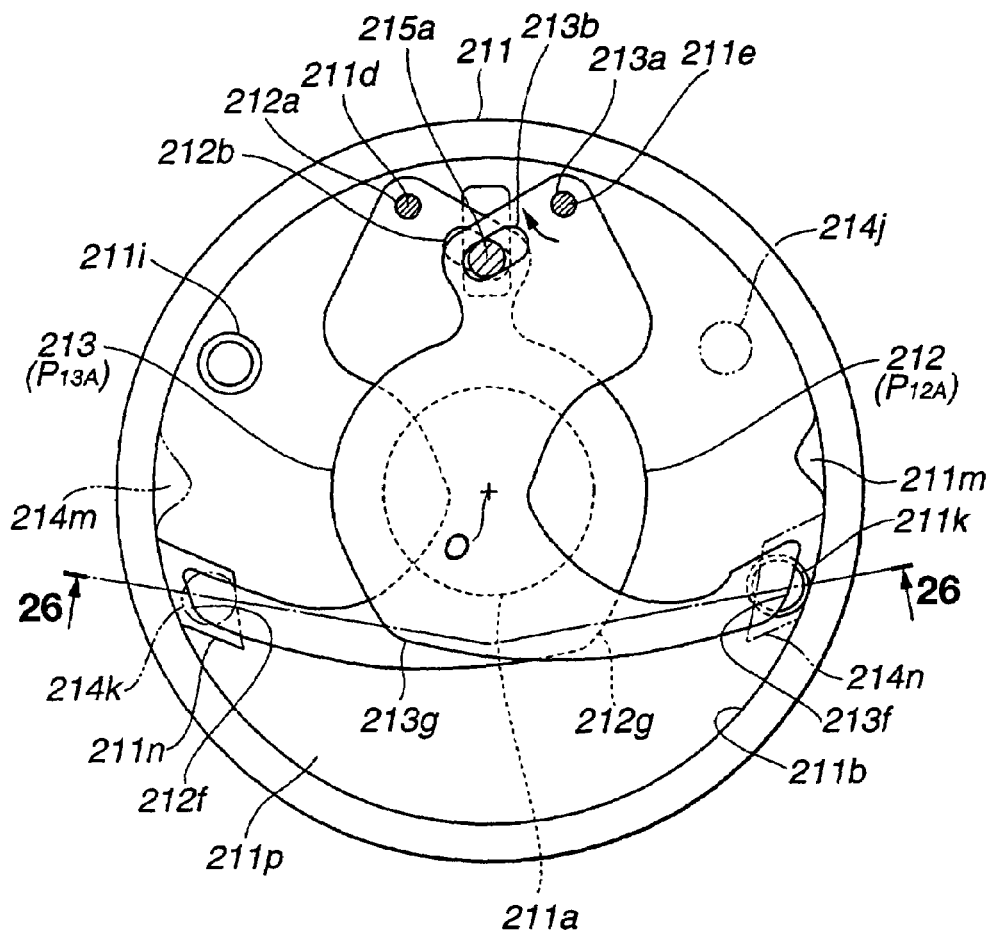
FIG. 25 is a plan view of the shutter device shown in FIG. 24 in a shut state viewed from the incident side.
Figure 26:
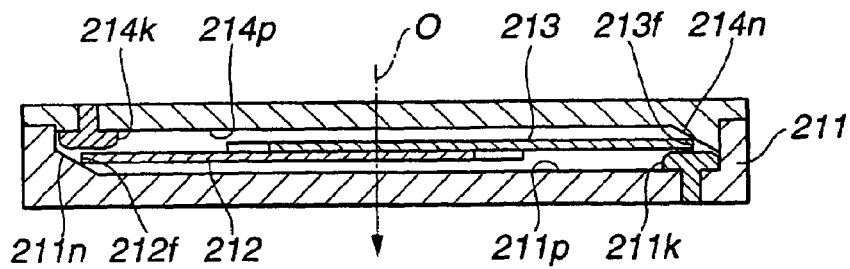
FIG. 26 is a sectional view looking in the direction of arrows 26—26 of FIG. 25.
Figure 27:
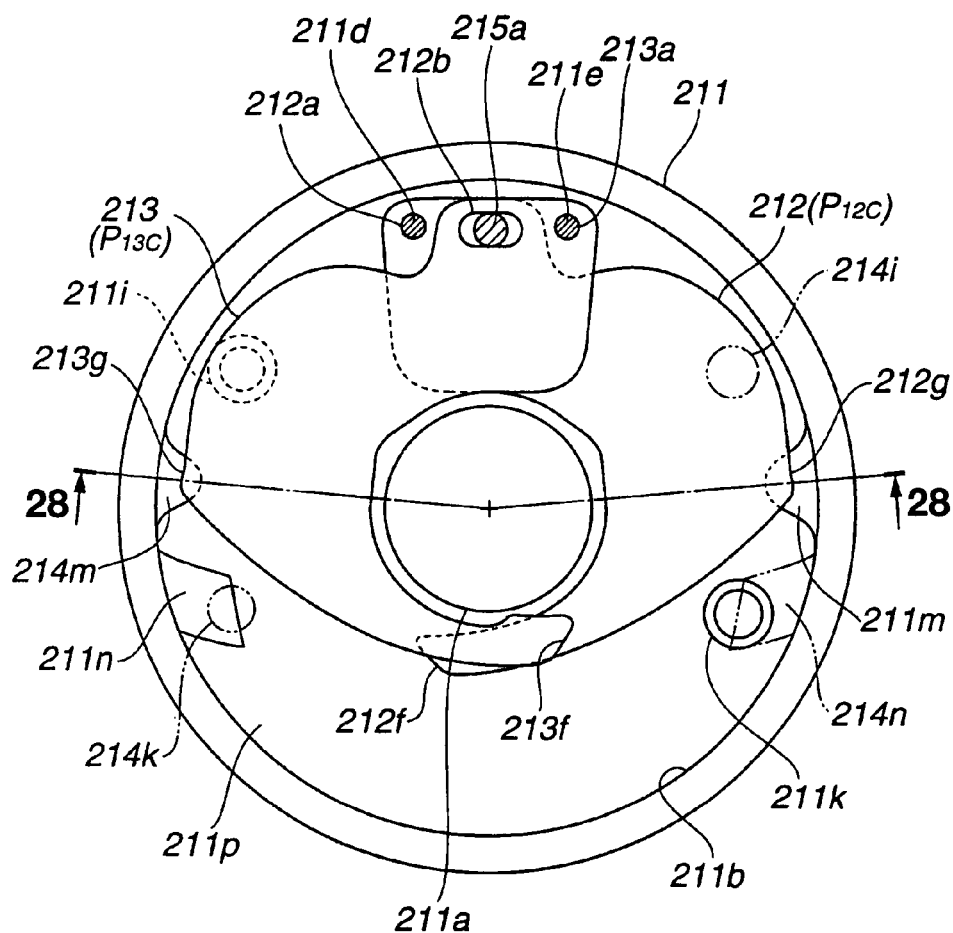
FIG. 27 is a plan view of the shutter device shown in FIG. 24 in an opened state viewed from the incident side.
Figure 28:
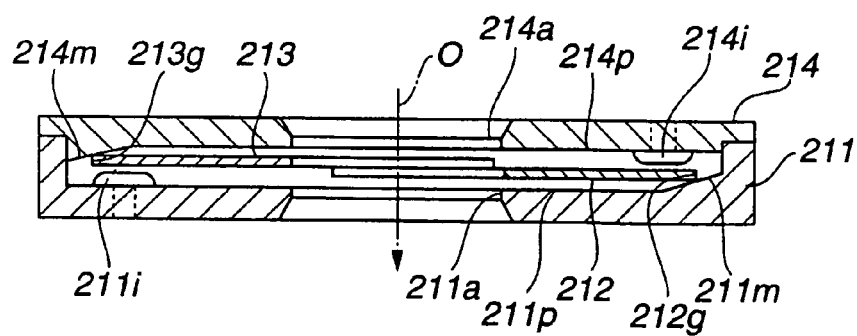
FIG. 28 is a sectional view looking in the direction of arrows 28—28 of FIG. 27.

FIG. 24 is an exploded perspective view of the shutter device according to the fourth embodiment; FIG. 25 is a drawing of the shut state of the shutter device viewed from the incident side (upside of FIG. 24); FIG. 26 is a sectional view looking along lines 26—26 of FIG. 25; FIG. 27 is a drawing of the opened state of the shutter device viewed from the incident side (upside of FIG. 24); and FIG. 28 is a sectional view looking along lines 28—28 of FIG. 27.

The shutter device according to the embodiment can be applied to a camera and the like. The shutter device, as shown in FIG. 24, mainly includes a shutter case 211 fixed to a mirror frame as a support member; two shutter blades 212 and 213 rotatably supported within the shutter case 211 in an overlapped state; a case lid 214 for restricting the movement of the shutter blades 212 and 213 in the optical axial direction O; and a shutter drive lever 215 rotatably supported on the bottom surface (upside of FIG. 24) of the shutter case 211 including a blade drive pin 215a.

The shutter case 211 includes an internal peripheral surface 211b, within which the shutter blades 212 and 213 are arranged; an internal surface 211p, which is a surface orthogonal to the optical axis O; an exposure opening 211a formed on the internal surface 211p for passing an object luminous flux therethrough; an elongated drive-pin hole 211c for insertion of the blade-drive pin 215a of the shutter drive lever 215; support pins 211d and 211e for rotatably supporting the shutter blades 212 and 213; and two inclined surfaces 211m and 211n, which are guiding units for guiding the deflection of the shutter blade 212. Furthermore, the shutter case 211 includes two damping members 211k and 211i respectively fixed to mounting holes 211j and 211h formed on the internal surface 211p.

The inclined surface 211m is a convex inclined surface formed on the internal surface 211p in the vicinity of the internal peripheral surface 211b, and is an inclined surface elevated in the opening rotational direction of the shutter blade 212 on a surface orthogonal to the optical axis O. The convex end 212g of the shutter blade 212 abuts the inclined surface 211m when the convex end 212g reaches the opened position of the shutter.

The inclined surface 211n is a convex inclined surface formed on the internal surface 211p in the vicinity of the internal peripheral surface 211b, and is an inclined surface elevated in the shutting rotational direction of the shutter blade 212 on a surface orthogonal to the optical axis O. An extended projection 212f of the shutter blade 212 abuts the inclined surface 211n when the extended projection 212f reaches the shut position of the shutter.

The damping members 211k and 211i are kinetic energy absorbing members made of a rubber vibration insulator, such as SORBOTHANE (TRADEMARK, Sorbothane Inc.) or HANENAITO (TRADEMARK, Naigai Rubber Industry Co. Ltd), both being shock absorbing materials. The damping members 211k and 211i, each having a circular flat plane extending along a surface orthogonal to the optical axis O with a smoothly chamfered inclined peripheral surface, are fixed into the mounting holes 211h and 211j of the shutter case 211, respectively, with adhesion, press-fitting, or caulking.

The circular flat plane of the damping member 211i is arranged in the vicinity of the opened terminal end of the rotational movement trajectory close to the rotational center of a convex end 213g of the shutter blade 213, which will be described later, at a position outside the movement trajectory and lower in a direction perpendicular to the blade moving direction with a slight clearance (FIG. 28).

The circular flat plane of the damping member 211k is arranged in the vicinity of the shut terminal end of the rotational movement trajectory of an extended projection 213f of the shutter blade 213, which will be described later, at a position outside the movement trajectory and lower in a direction perpendicular to the blade moving direction with a slight clearance (FIG. 26).

The case lid 214 is attached by fitting an external peripheral projection-face 214b to the internal peripheral surface 211b of the shutter case 211, and has an internal surface 214p orthogonal to the optical axis O. On the internal surface 214p, the case lid 214 is provided with an opening 214a for passing an object luminous flux therethrough, pin holes 214d and 214e for insertion of the support pins 211d and 211e, and two inclined surfaces 214m and 214n, which are guiding units for guiding the deflection of the shutter blade 213. Furthermore, the case lid 214 includes two damping members 214i and 214k, which are shock absorbing materials (kinematic energy absorbing members), respectively fixed to mounting holes 214h and 214j formed on the internal surface 214p.

The inclined surface 214m is a convex inclined surface formed on the internal surface 214p in the vicinity of the internal peripheral projection face 214b, and is an inclined surface elevated in the opening rotational direction of the shutter blade 213 on a surface orthogonal to the optical axis O. The convex end 213g of the shutter blade 213 abuts the inclined surface 214m when the convex end 213g reaches the opened position of the shutter.

The inclined surface 214n is a convex inclined surface formed on the internal surface 214p in the vicinity of the internal peripheral projection face 214b, and is an inclined surface elevated in the shutting rotational direction of the shutter blade 213 on a surface orthogonal to the optical axis O. The extended projection 213f of the shutter blade 213 abuts the inclined surface 214n when the extended projection 213f reaches the shut position of the shutter.

The damping members 214i and 214k are the members made of a rubber vibration insulator, such as SORBOTHANE (TRADEMARK, Sorbothane Inc.) or HANENAITO (TRADEMARK, Naigai Rubber Industry Co. Ltd), both being shock absorbing materials. The damping members 214i and 214k, each having a circular flat plane extending along a surface orthogonal to the optical axis O with a smoothly chamfered inclined peripheral surface, are respectively fixed into the mounting holes 214h and 214j of the case lid 214, with adhesion, press-fitting, or caulking.

The circular flat plane of the damping member 214i is arranged in the vicinity of the opened terminal end of the rotational movement trajectory close to the rotational center of the convex end 212g of the shutter blade 212, which will be described later, at a position outside the movement trajectory and upper in a direction perpendicular to the blade moving direction with a slight clearance in that the shutter blade 212 is movable (FIG. 28).

The circular flat plane of the damping member 214k is arranged in the vicinity of the closed terminal end of the rotational movement trajectory of the extended projection 212f of the shutter blade 212, which will be described later, at a position outside the movement trajectory and upper in a direction perpendicular to the blade moving direction with a slight clearance in that the shutter blade 212 is movable (FIG. 26).

Each of the shutter blades 212 and 213 includes a shielding portion of an opening formed at the center for shielding the opening 211a. The shutter blades 212 and 213 are provided with rotational shaft holes 212a and 213a, each being formed at one end, elongated drive pin holes 212b and 213b for fitting to the blade-drive pin 215a, the extended projections 212f and 213f disposed outside the opening shielding portion and extending in the shutting rotational direction, and the convex ends 212g and 213g disposed on in the rear of the opening shielding portion, respectively.

The shutter drive lever 215 is rotationally driven by a known shutter driving solenoid and a drive-lever returning spring so as to open and shut the shutter blades 212 and 213 via the drive pin 215a. That is, if the solenoid is turned off, the shutter blades 212 and 213 are driven by the shutter drive lever 215 in the shutting direction with an abutting force of the returning spring of the solenoid. If the solenoid is turned on (sucking state), the shutter drive lever 215 is driven in the opening direction so that the shutter blades 212 and 213 are rotationally driven at the opened position.

The two shutter blades 212 and 213, as shown in FIG. 28, are rotatably supported by the support pins 211d and 211e in the state overlapping the shutter blade 212 adjacent to the opening 211a and the shutter blade 213 adjacent to the opening 214a of the internal space formed of the internal surfaces 211p and 214p of the shutter case 211 and the case lid 214. The vertical overlapping state of the shutter blades 212 and 213 in the optical axial direction O is maintained over the entire rotational range with the overlapping of the extended projections 212f and 213f.

When the shutter blades 212 and 213 are located at shut positions P12A and P13A (terminal positions), respectively, as shown in FIG. 25, the distal ends of the extended projection 212f and 213f of the shutter blades abut the inclined surface 211n or 214n, or being immediately before abutting. In the abutment state of the inclined surface, with a slight clearance movable upward or downward opposing the extended projections 212f and 213f of the shutter blades 212 and 213 in the optical axial direction O, the flat plane of the damping member 214k or the flat plane of the damping member 211k are positioned (out of movement trajectory).

In this state, if the shutter blades are further displaced in the shutting direction orthogonal to the optical axis O, the extended projections 212$f$ and 213$f$ slide on the inclined surfaces so that the distal ends thereof move in the optical axial direction O so as to abut the flat plane of the damping member 214$k$ or the flat plane of the damping member 211$k$.

On the other hand, when the shutter blades 212 and 213 are located at opened positions P12C and P13C (terminal positions), respectively, as shown in FIG. 28, ends of the convex ends 212$g$ and 213$g$ of the shutter blades abut the inclined surface 211$m$ or 214$m$, or being immediately before abutting. In the abutment state of the inclined surface, with a slight clearance movable upward or downward opposing close to (i.e. in the vicinity of) the rotation support pin in the vicinity of the convex ends 212$g$ and 213$g$ of the shutter blades 212 and 213 in the optical axial direction O, the flat plane of the damping member 214$i$ or the flat plane of the damping member 211$i$ are positioned (out of movement trajectory). In this state, if the shutter blades are further displaced in the opening direction orthogonal to the optical axis O, the convex ends 212$g$ and 213$g$ slide on the inclined surfaces so that ends thereof move in the optical axial direction O so as to abut the flat plane of the damping member 214$i$ or the flat plane of the damping member 211$i$.

Next, the opening and shutting operation of the shutter device according to the embodiment structured as above will be described.

First, in the shut state, as shown in FIG. 25, the shutter blades 212 and 213 are located at the shut positions P12A and P13A, so that the opening 211$a$ is completely closed. The shutter blades 212 and 213 are held with a slight clearance suitable for movement without light leakage in a sandwiched state between the internal surface 214$p$ of the case lid 214 and the internal surface 211$p$ of the shutter case 211.

Then, when the shutter drive lever 215 is rotationally driven clockwise so as to start opening the shutter, the shutter blades 212 and 213 are respectively rotated in the opening direction (counterclockwise or clockwise). Then, when the shutter blades 212 and 213 reach the opened positions P12C and P13C shown in FIG. 27 (movement completion), the shutter drive lever 215 stops rapidly, so that the shutter blades 212 and 213 are displaced from the terminal position of the opened positions P12C and P13C further in the opening direction by the kinetic energy produced at that time (backlash, bending of the plane of the blade itself so-called flexure). The convex ends 212$g$ and 213$g$ slide on the inclined surfaces 211$m$ and 214$m$ so as to move upward or downward. By this movement, ends close to the support pins of the convex ends 212$g$ and 213$g$ abut the flat planes of the damping members 214$i$ and 211$i$, so that kinetic energy of the shutter blades 212 and 213 is absorbed by the damping members 214$i$ and 211$i$, respectively. Therefore, the displacement of the shutter blades is reduced and the shutter blades stop in a state that further bounding is suppressed. That is, the opening 211$a$ once opened cannot change in the shutting direction so that the shutter blades 212 and 213 are completely stopped at the shut positions P12C and P13C.

When the shutter drive lever 215 is rotationally driven counterclockwise so as to start shutting the shutter from the opened state shown in FIG. 27, the shutter blades 212 and 213 respectively rotate in the shutting direction (clockwise or counterclockwise). Then, when the blades reach the shut positions P12A and P13A shown in FIG. 25 (movement completion), the shutter drive lever 215 stops rapidly, so that by the kinetic energy at that time, the shutter blades 212 and 213 further displace in the shutting direction from the terminal positions of the shut positions P12A and P13A (backlash, bending of the plane of the blade itself so-called flexure). Then, the extended projections 212$f$ and 213$f$ slide on the inclined surfaces 211$n$ and 214$n$ so as to move upside or downside, respectively. By the movement, the extended projections 212$f$ and 213$f$ abut the flat planes of the damping members 214$k$ and 211$k$, so that the kinetic energy of the shutter blades 212 and 213 is absorbed by the damping members 214$k$ and 211$k$, respectively. Therefore, the displacement of the shutter blades is reduced and the shutter blades stop with the bounding afterward in the suppressed state. That is, without light leakage from the opening 211$a$ once shut due to the clearance between blades produced by blade bounding, the shutter blades 212 and 213 completely stop at the shut positions P12A and P13A.

As described above, according to the shutter device of the fourth embodiment, in comparison with a conventional shutter device without a bound-preventing function, there is provided a shutter device which occupies a small space and is capable of speeding up and efficiently suppressing the shutter blade bounding during the shutting operation so as to have preferable shutter operation scarcely affecting the shutter speed time by a simplified structure in that the inclined surfaces 211$n$ and 211$m$ and the inclined surfaces 214$n$ and 214$m$ are integrally arranged on the internal planes of the shutter case 211 and the case lid 214 and only the damping members 211$i$, 211$k$, 214$i$, and 214$k$ are added so as to oppose the extended projections and the convex ends of the shutter blades in the vicinities of the inclined surfaces.

In the shutter device according to the third and fourth embodiments described above, the bounding of the blades at the opened position or the shut position is suppressed when the shutter blades finish their movement; alternatively, the bounding when the shutter blades are temporarily stopped may be suppressed. That is, by arranging the damping member and/or the inclined surface at a position opposing the extended projection from the above or the below, the bounding when the blades are temporarily stopped may also be suppressed, for example.

In addition to the shutter device according to the third and fourth embodiments, when a prior art in that a shock absorber is arranged within the blade movement trajectory is incorporated, the advantages are fully ensured.

As described above, according to the third and fourth embodiments, bounding during the opening and shutting operation of the shutter blades can be suppressed so as to have reliable shutter operation, so that a shutter device with a simplified structure and a small space necessary for arrangement can be provided.

The present invention is not limited to the embodiments described above and various modifications can be made in an execution phase within the scope of the invention. Furthermore, in the embodiments described above, inventions in various phases are included, so that various inventions can be extracted from an appropriate combination of a plurality of disclosed components. For example, even when several components are deleted from the entire components shown in the embodiments, if the problems described in the section of problems to be solved by the invention can be solved and advantages described in effect of the invention can be obtained, the structure without the deleted components can be extracted as an invention.

The invention claimed is:

1. A shutter device comprising:
   a shutter blade movable between first and second end positions for selectively opening and closing said shutter device; and
   a member formed of shock absorbing material displaced from a trajectory of the shutter blade moving between said open and closed position for suppressing bounding of said blade when the blade is displaced in a direction toward said member.

2. A device according to claim 1, wherein the shutter device is a lens shutter device.

3. A device according to claim 1, wherein the member formed of a shock absorbing material is directly engaged by the shutter blade for suppressing bounding of the blade.

4. A shutter device comprising:
   a shutter blade; and
   a member formed of a shock absorbing material arranged at a position displaced from a movement trajectory of the shutter blade which is deflected toward said member during movement of the shutter blade or immediately after the movement thereof in a direction substantially perpendicular to a moving direction of the shutter blade whereby the blade engages said member.

5. A device according to claim 4, wherein the shutter device is a lens shutter device.

6. A shutter device comprising:
   a shutter blade; and
   a member formed of a shock absorbing material arranged in a vicinity of a movement trajectory of the shutter blade and being engaged by the shutter blade when the shutter blade moves in a direction transverse to the movement trajectory.

7. A device according to claim 6, wherein the shutter device is a lens shutter device.

8. A device according to claim 6, wherein the member formed of a shock absorbing material is directly engaged by the shutter blade for suppressing bounding of the blade when the blade is moved in the transverse direction by a guide unit.

9. A device according to claim 6, wherein the blade moves in the transverse direction due to an abrupt stoppage in movement of the blade.

10. A shutter device comprising:
    a shutter blade;
    a guide unit for guiding a portion of the shutter blade in a direction transverse to a path of movement of said blade at a location where the shutter blade is temporarily stopped or finishes the movement of the shutter blade; and
    a stationary absorbing member for absorbing kinetic energy of the shutter blade and positioned to abut the shutter blade portion when the shutter blade is guided by said guide unit.

11. A device according to claim 10, wherein the shutter device is a lens shutter device.

* * * * *

UNITED STATES PATENT AND TRADEMARK OFFICE
CERTIFICATE OF CORRECTION

PATENT NO. : 7,025,513 B2  Page 1 of 1
APPLICATION NO. : 10/714148
DATED : April 11, 2006
INVENTOR(S) : Tatsuo Takanashi It is certified that error appears in the above-identified patent and that said Letters Patent is hereby corrected as shown below:

IN THE SPECIFICATION

At column 13, line 11, after the words "134 arranged on the second plane", delete "13 if" and insert therefor -- 131f --.

Signed and Sealed this

Twenty-sixth Day of May, 2009

JOHN DOLL
*Acting Director of the United States Patent and Trademark Office*